US008032116B2

(12) United States Patent  
Tanaka et al.

(10) Patent No.: US 8,032,116 B2
(45) Date of Patent: *Oct. 4, 2011

(54) COMMUNICATION APPARATUS, PORTABLE TERMINAL AND COMMUNICATION CONTROL PROGRAM

(75) Inventors: Shingo Tanaka, Kanagawa-Ken (JP); Akihiko Sugikawa, Fukushima-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 800 days.

This patent is subject to a terminal disclaimer.

(21) Appl. No.: 12/033,095

(22) Filed: Feb. 19, 2008

(65) Prior Publication Data

US 2008/0146196 A1 Jun. 19, 2008

Related U.S. Application Data

(63) Continuation of application No. 10/862,540, filed on Jun. 8, 2004, now Pat. No. 7,359,696.

(30) Foreign Application Priority Data

Jun. 10, 2003 (JP) ................................. 2003-165630

(51) Int. Cl.
*H04M 1/66* (2006.01)

(52) U.S. Cl. .................. 455/411; 455/412.1; 455/412.2; 455/414.1; 340/426.36; 340/5.5; 340/10.1; 340/10.6; 340/5.8; 340/10.2; 340/10.3; 340/10.4; 340/10.5

(58) Field of Classification Search .................. 455/411, 455/412.1, 412.2, 414.1; 340/426.36, 5.5, 340/10.1–10.6, 5.8

See application file for complete search history.

(56) References Cited

U.S. PATENT DOCUMENTS

| 6,208,239 | B1 | 3/2001 | Muller et al. |
| 6,522,027 | B1 | 2/2003 | Morillon et al. |
| 6,522,634 | B1 | 2/2003 | Ohashi |
| 6,697,638 | B1 | 2/2004 | Larsson et al. |
| 6,717,516 | B2 | 4/2004 | Bridgelall |
| 6,831,547 | B2 | 12/2004 | Watarai et al. |
| 2001/0031626 | A1 | 10/2001 | Lindskog et al. |
| 2002/0045454 | A1 | 4/2002 | Iwata |
| 2003/0220765 | A1 | 11/2003 | Overy et al. |
| 2004/0102160 | A1 | 5/2004 | Sleptchenko et al. |

FOREIGN PATENT DOCUMENTS

| JP | 09-004293 | 1/1997 |
| JP | 2000-078646 | 3/2000 |
| JP | 2001-115707 | 4/2001 |
| JP | 2001-128222 | 5/2001 |
| JP | 2001-336321 | 12/2001 |
| JP | 2002-054331 | 2/2002 |
| JP | 2002-096715 | 4/2002 |
| JP | 2003-018656 | 1/2003 |

*Primary Examiner* — Nimesh Patel

(74) *Attorney, Agent, or Firm* — Oblon, Spivak, McClelland, Maier & Neustadt, L.L.P.

(57) ABSTRACT

A communication method, including: sending a response signal including terminal information to a portable terminal upon receiving an identification information request; accepting periodically a connection request from the portable terminal during a period not shorter than a second period and three-fold period not longer than the second period, for each period not shorter than the third period and not longer than three-fold period of the third period; establishing a wireless link with the portable terminal upon receiving the connection request; and controlling an execution apparatus for executing a predetermined operation after the link connection establishment unit has established the wireless link.

8 Claims, 17 Drawing Sheets

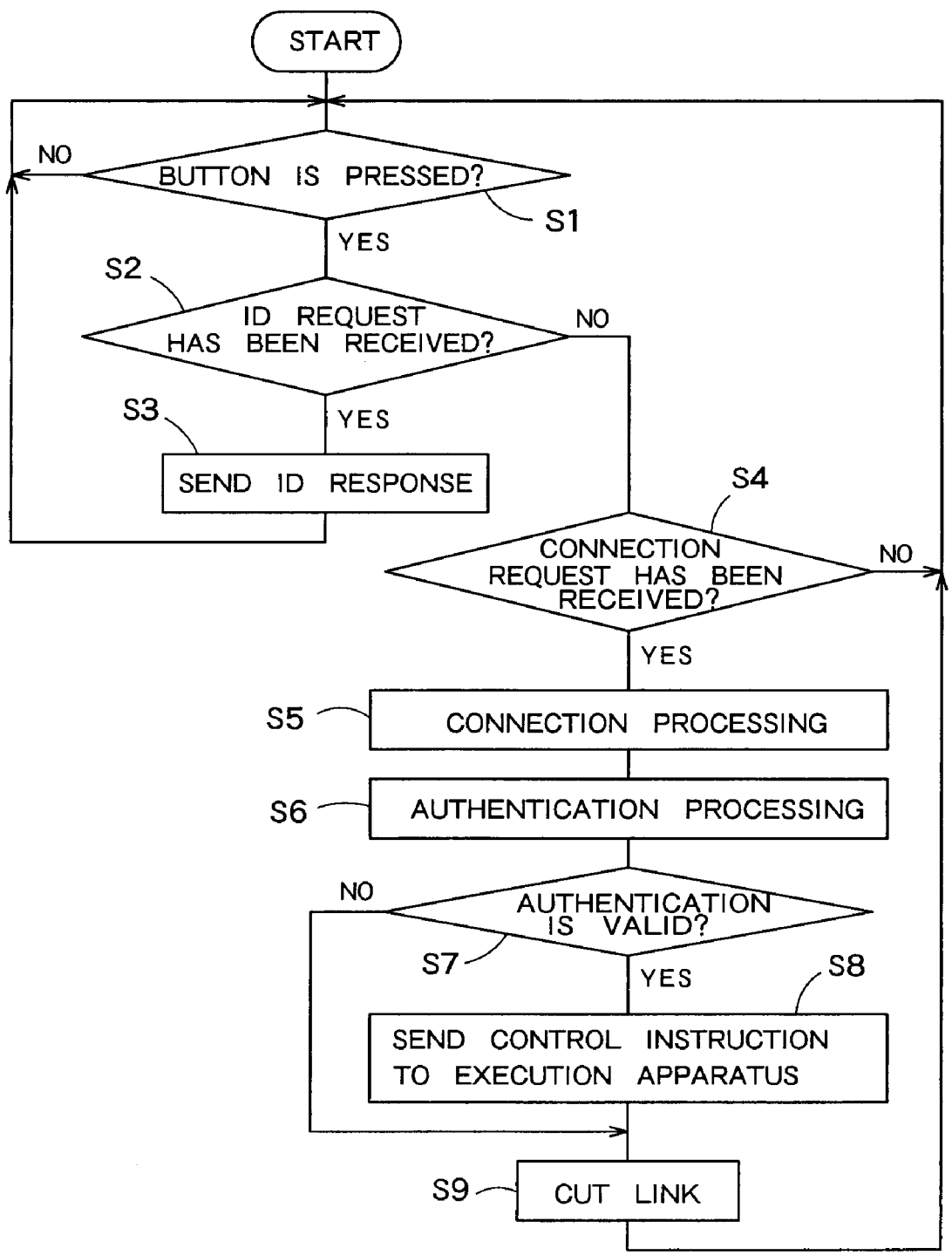
F I G. 2

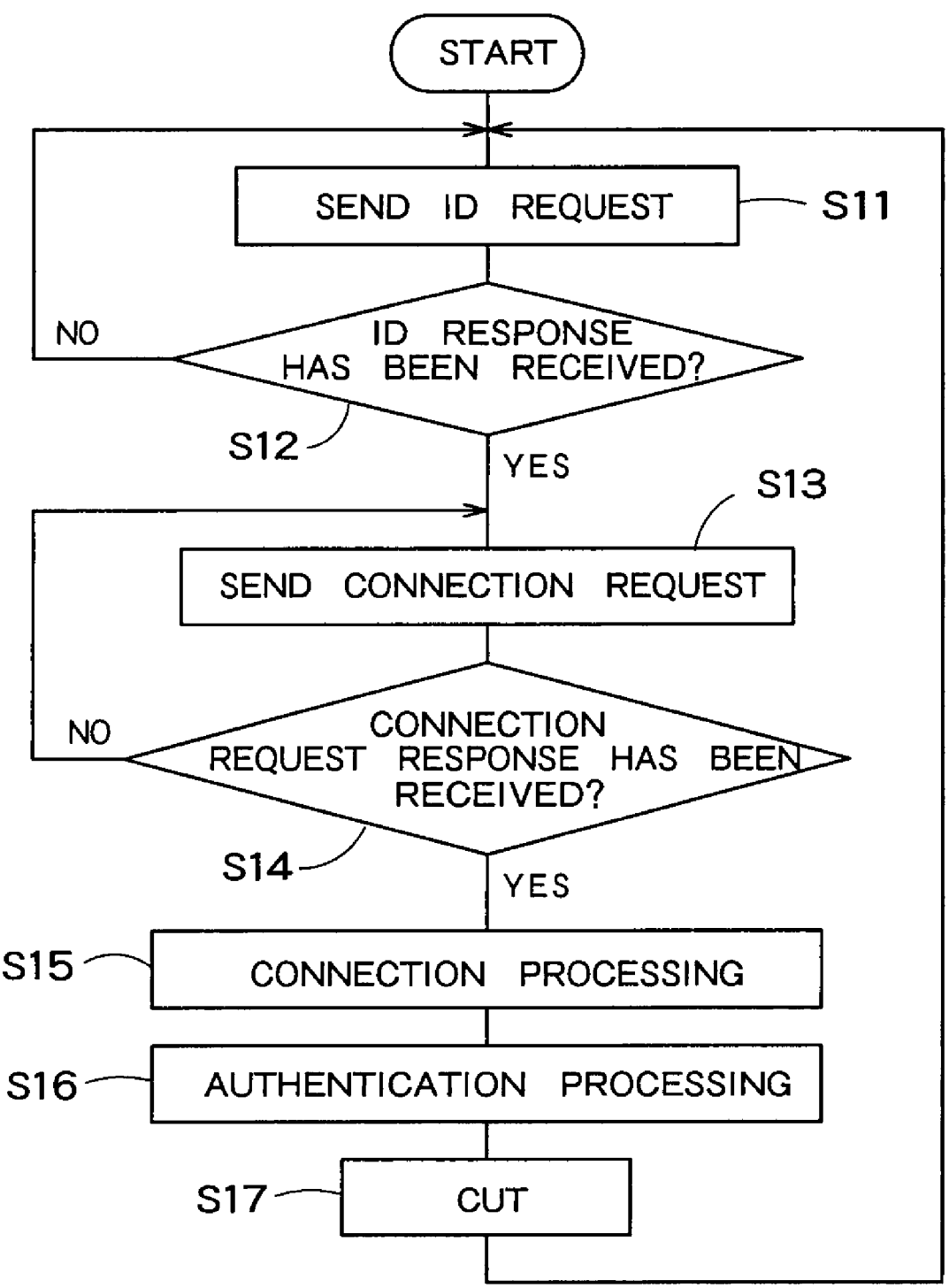
F I G. 3

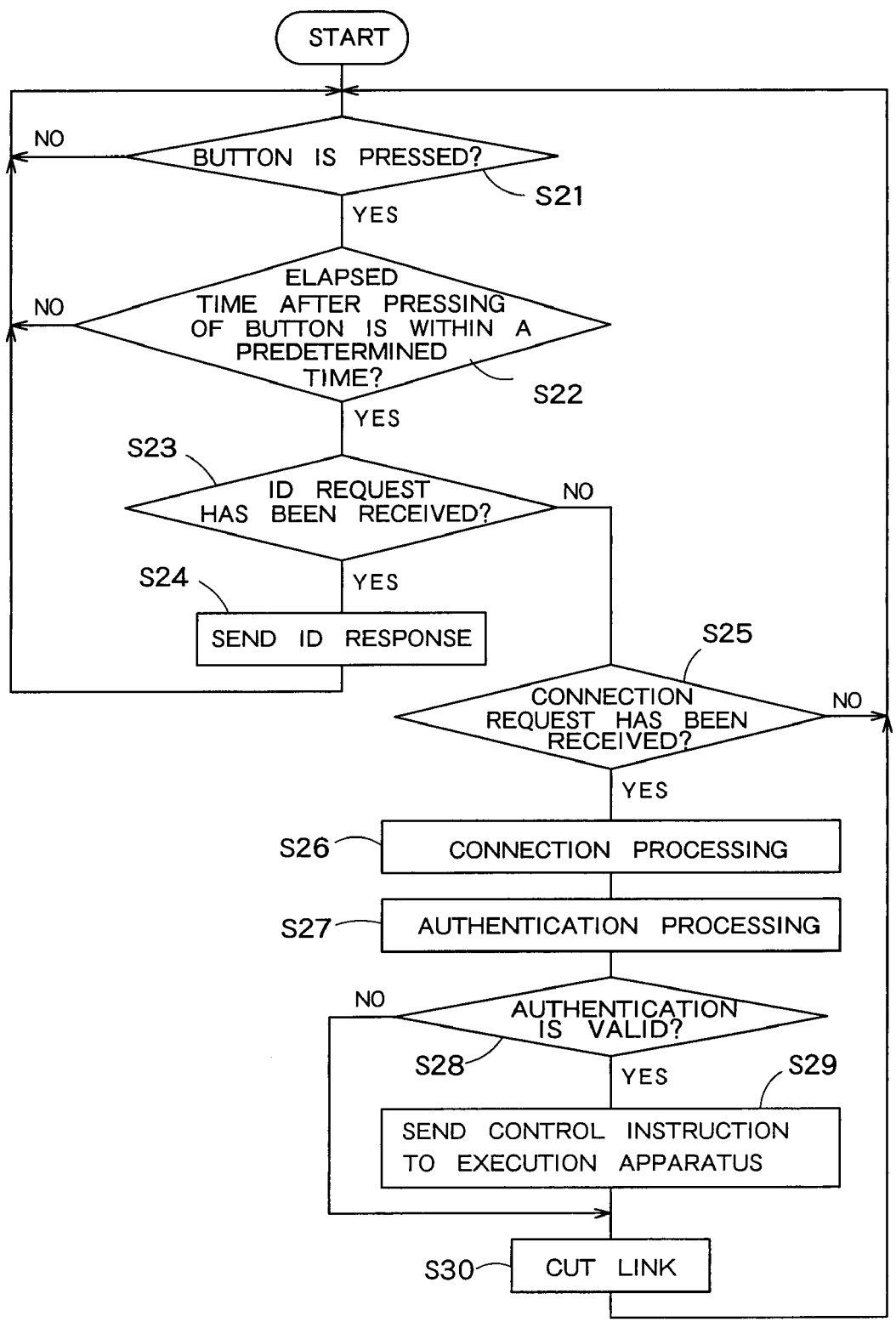
F I G. 7

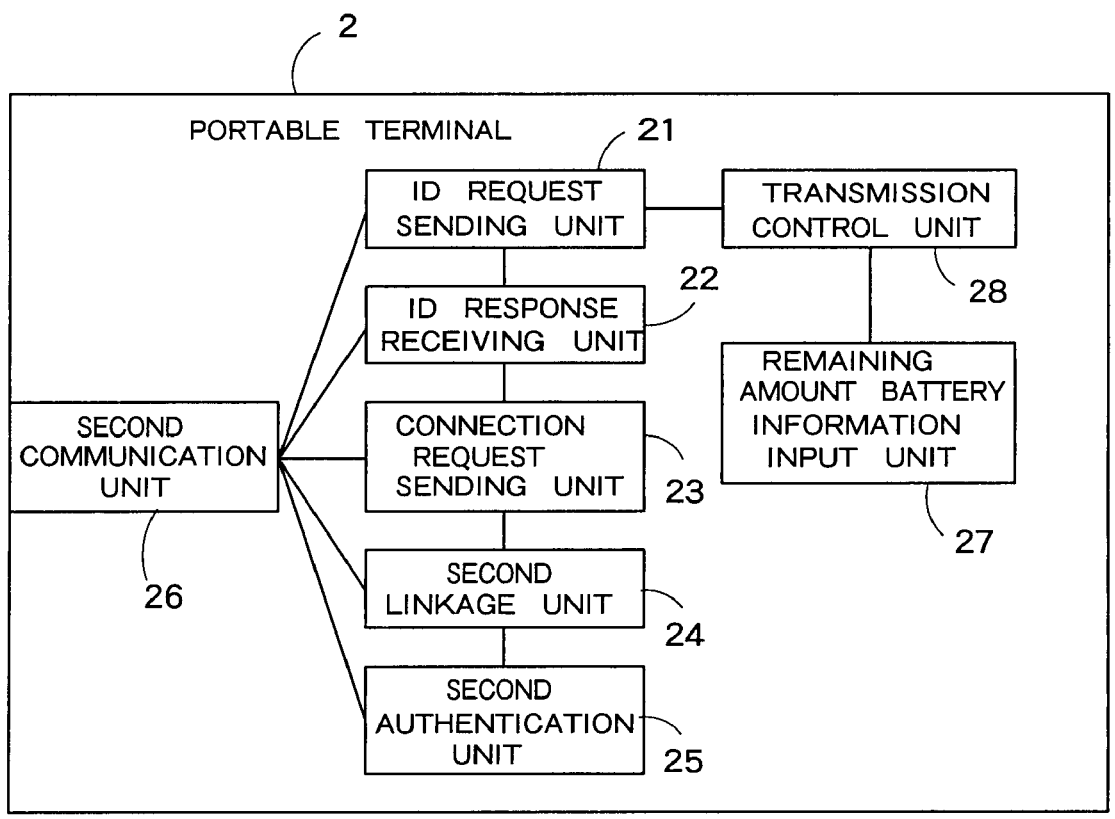
F I G. 8

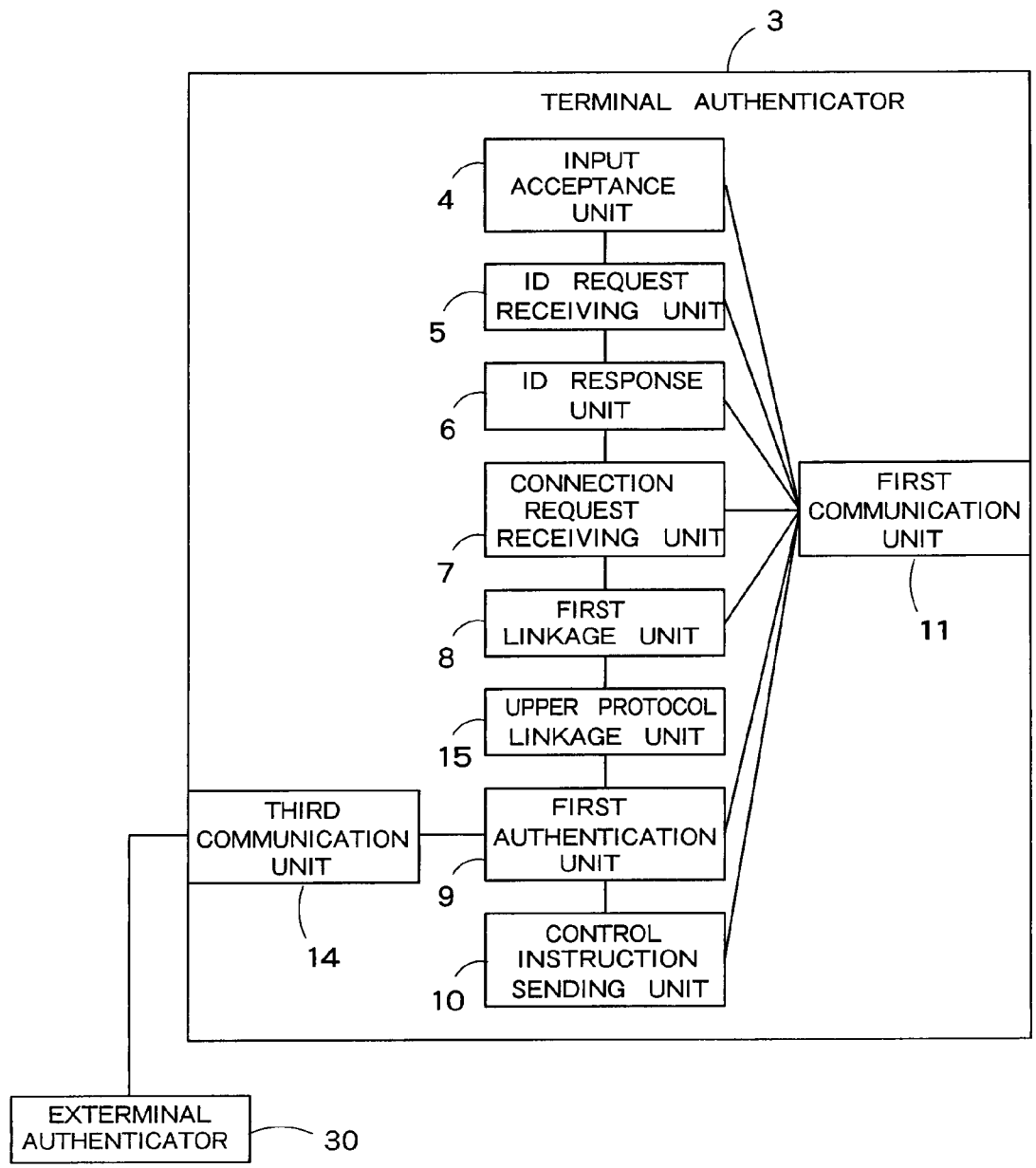
F I G. 9

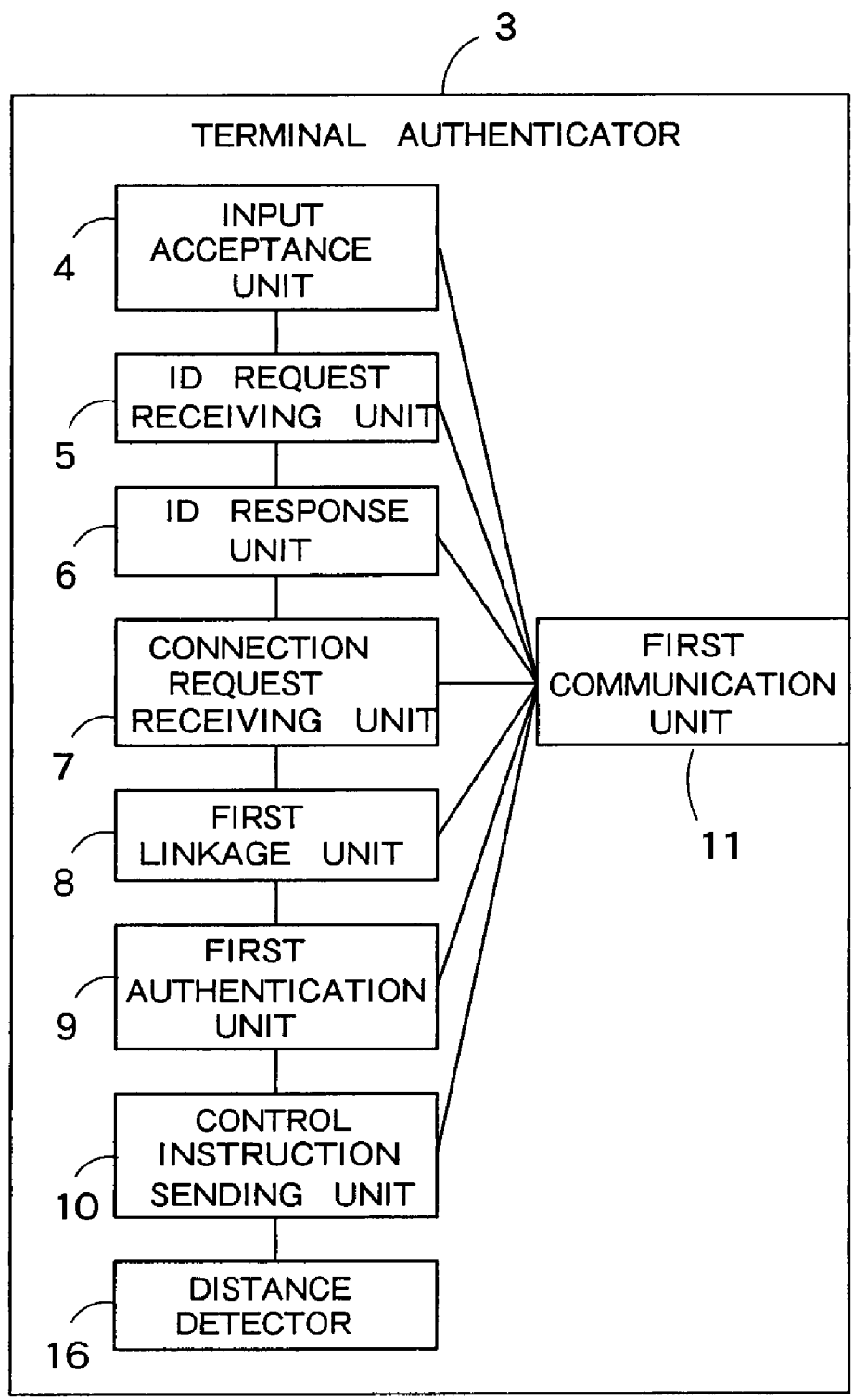
F I G. 11

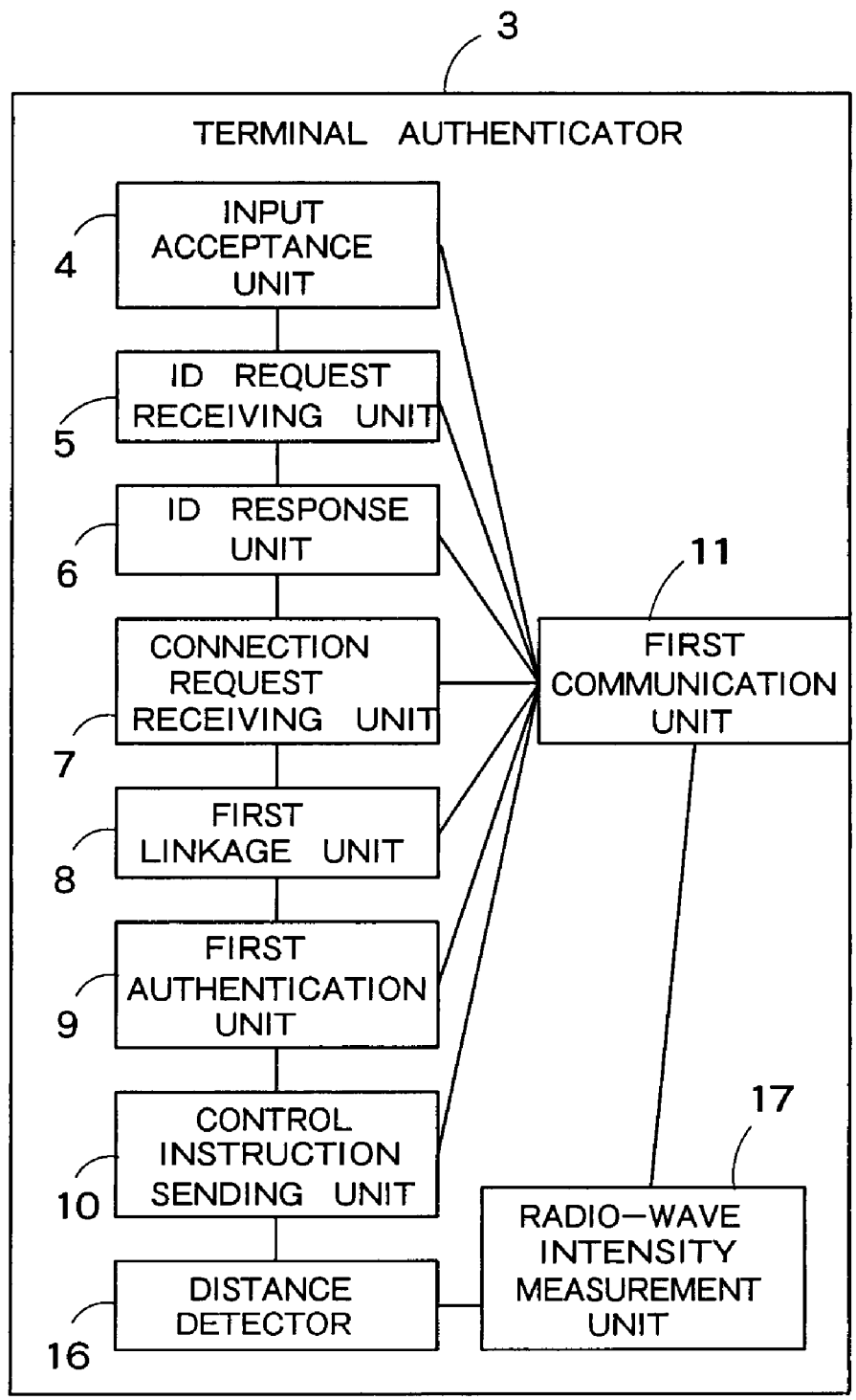
F I G. 13

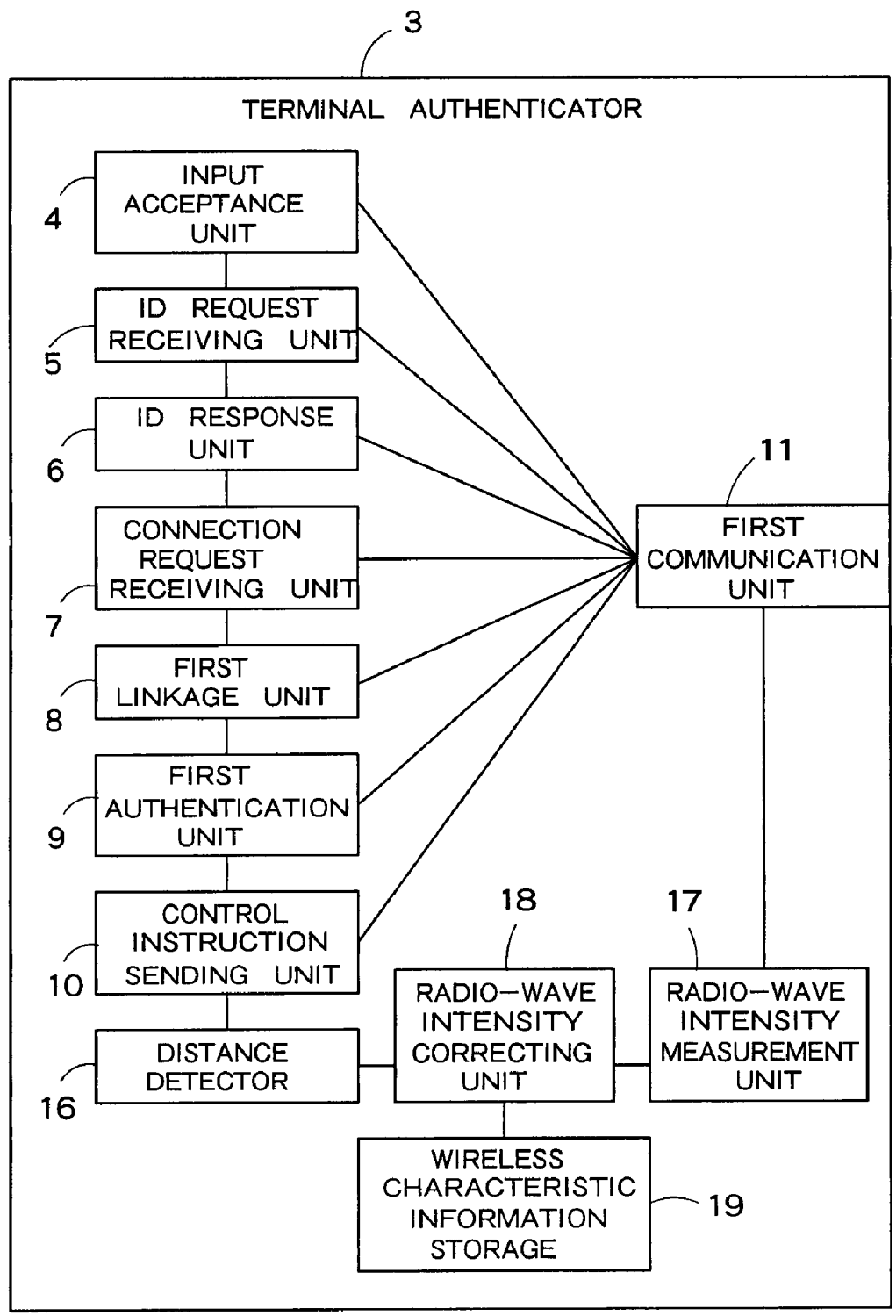
F I G. 14

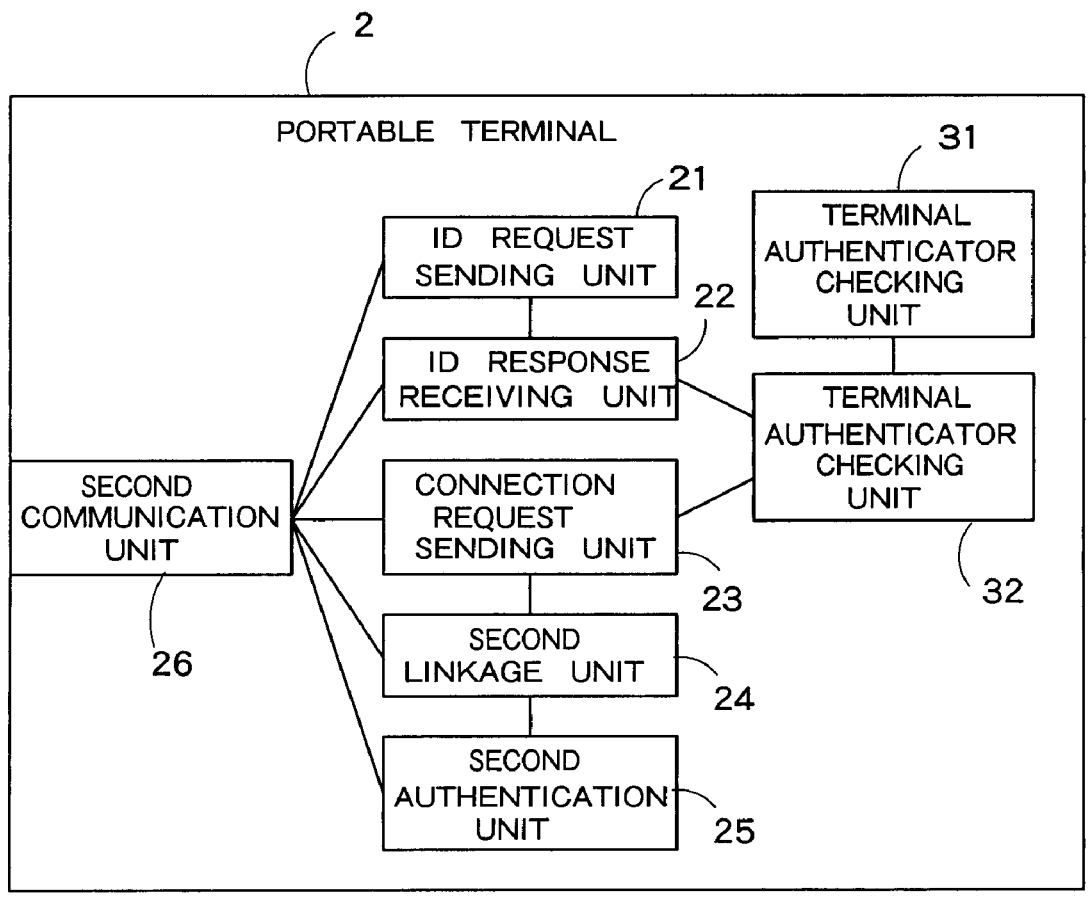
F I G. 15

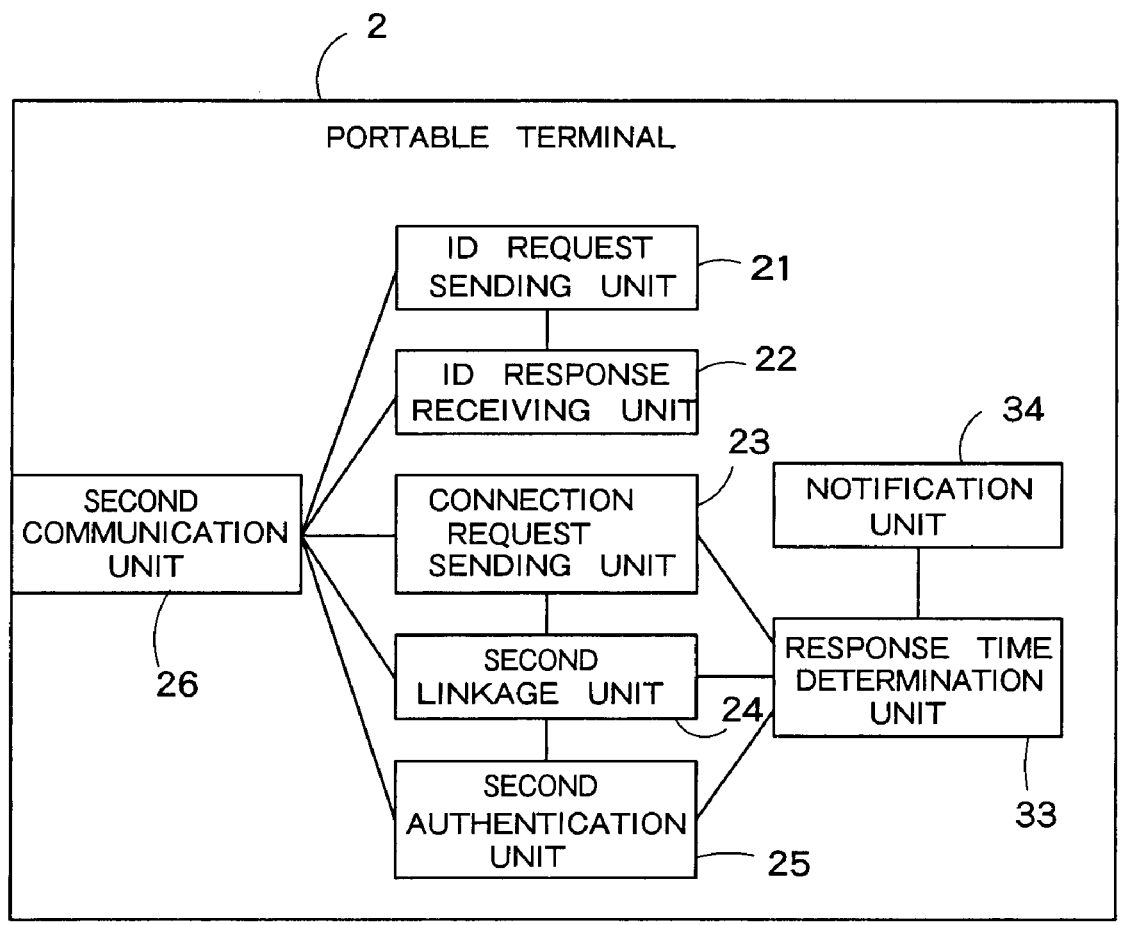
F I G. 17

COMMUNICATION APPARATUS, PORTABLE TERMINAL AND COMMUNICATION CONTROL PROGRAM

CROSS REFERENCE TO RELATED APPLICATIONS

The present continuation application claims benefit of priority under U.S.C. §120 to application Ser. No. 10/862,540, filed on Jun. 8, 2004, and under 35 U.S.C. §119 from Japanese Patent Application No. 2003-165630, filed on Jun. 10, 2003, the entire contents of both are hereby incorporated herein by reference.

BACKGROUND OF THE INVENTION

1. Field of the Invention

The present invention relates to a communication apparatus, a portable terminal, and a communication control program which control ON/OFF of an execution apparatus, according to the result of communication therewith.

2. Related Background Art

Recently, what is called a keyless system has come into wide use which permits locking and unlocking a car door from a distance without the need for a physical key. A typical keyless system uses extremely weak radio waves of a frequency about 300 MHz or below to perform user authentication between the user's key and a radio authentication module installed in the car. When the use's key is authenticated, sends a locking or unlocking signal from the radio authentication module to the car. In such weak radio-wave base stations, no license is required for operation of a radio station; and radio waves of around 300 MHz well cover a range of about 10 m.

With the most popular keyless system in use, it is necessary for the user to press a button on the key when a user wants to open (close) the door lock. In this case, the user follows the procedure described below.

The user: (1) walks up to the car; (2) feels inside his or her pocket or bag for the key; (3) takes it out; and (4) presses the button on the key to undo the door lock (5).

The radio authentication module mounted in the car periodically tries to receive radio waves from the key. Accordingly, when the radio wave from the key actuated by user's pressing of the button on the key is received by the radio authentication module, authentication is immediately performed, which is followed by opening (closing) the door lock. When the button on the key is not pressed, no radio waves are not sent from the key—this lengthens the lifetime of the battery (2 to 5 years under normal usage condition) built in the key.

To solve another problem of the locking/unlocking system by radio waves, for example, to prevent faulty or erroneous unlocking, there is proposed a system that automatically closes the door lock a certain elapsed time after opening the lock. In this case, although the door is opened to get on the vehicle, the door is automatically closed when it takes much time to load baggage, thereby imposing inconvenience on the user. There is also known an invention intended as a solution to this problem (See Japanese Patent Application Laid-open No. 2001-115707).

The actuation of the button on the key will be described below. The button actuation is necessary for suppressing the power consumption of the key battery to length the battery life. But the actuation of the button impairs user convenience. That is, to open the door lock when the user has an umbrella or other stuffs in hand on the same side as the pocket in which the key is carried, or when the user carries his belongings in both hands, it is necessary for the user to shift the umbrella or the other stuffs from one hand to the other or place them somewhere around the user.

To improve user's convenience, there are also proposed keyless systems that do not involve the button actuation. In conventional keyless systems, to open the door lock when the user has an umbrella or other stuffs in hand on the same side as the pocket in which the key is carried, or when the user carries his belongings in both hands, it is necessary for the user to shift the umbrella or the other stuffs from one hand to the other or place them somewhere around the user. On the contrary, these keyless systems without involving the button actuation obviate the inconveniences arising from the actuation of the button even when the user has belongings in both hands.

The keyless systems roughly have two types. The one type is that uses extremely weak radio waves as in the above, and the key enters a radio wave sending mode and a radio wave receiving mode at regular time intervals. When the user carrying the key approaches the car and each of the key and the car enters the radio wave coverage of the other, authentication is automatically performed based on authentication protocols to unlock the car door.

In the other type of keyless system, although the key similarly enters the radio wave sending and receiving modes at regular time intervals, the car normally stops its communication facility at all times, and when the user presses an instruction button mounted on the car door in proximity to the door handle, the car activates the communication facility. If the key stays within the radio wave coverage at that time, authentication is performed based on authentication protocols to open the door lock.

The authentication (encryption) algorithm for the authentication of the keyless systems is usually a common key system. For example, in the case where the system is built up using a cutting-edge encryption algorithm, such as AES, and a key of a sufficiently long key length, it is impossible with the computing power of the present-day computers to decrypt the key within an actual time to open the door lock. Accordingly, this system provides increased security as compared with ordinary systems using physical keys.

Furthermore, there has been developed a system which performs ignition of a car engine through authentication by an encryption algorithm with a view to utilizing the security of the key encryption algorithm. In an ignition key system generally called an immobilizer, when the user inserts the key into an ignition hole and turns it to a predetermined position, a current signal flows between the key hole and the key, and authentication is performed between an authentication module built in the key and the immobilizer directly connected to the engine based on authentication protocols.

As described above, the car key system has introduced therein a wide variety of techniques so as to improve user convenience and security. In the current car key systems, however, the user cannot open/close door lock and start the engine unless he carries the key device exclusive to the car. If the above-mentioned function of the key device is incorporated in some other device that the user carries in every day life, user convenience could be further improved.

One possible device that the user carries on a day-to-day basis is a portable terminal such as portable telephone or PDA. The portable telephone enables communications with a fixed telephone or other portable telephones and access to the Internet via radio base stations installed by portable telephone providers. In recent years, there is a move afoot to install a second wireless communication apparatus in the portable telephone. The second wireless communication apparatus has, in principle, a coverage area from close proximity to 100 m, and enables communications with other terminals without the radio base stations by the providers.

Attention is being given to the Bluetooth™ communication system that utilizes the ISM band of the 2.4 GHz band and its neighboring frequencies and is not required to obtain a license. Conventional radio LANs have an effective coverage area of 100 m or more, whereas the Bluetooth system has a smaller coverage area, and consumes less power accordingly. Hence, this system is suitable for use in an information processor whose battery life is limited, such as a portable telephone. In recent years, portable telephones using the Bluetooth communication system and PDA or similar portable information processors (hereinafter, simply "portable terminals") are becoming widespread. As for the details of Bluetooth, its specification can be obtained on a Website http://www.bluetooth.org/.

If the Bluetooth and other wireless communication apparatuses could be applied to the keyless system to open/close the door lock and start ignition of the car engine, the user would not be required to carry the key dedicated for the car, thereby improving user convenience. However, since the wireless communication apparatus mounted in the portable terminal is intended mainly for information transmission at a high transfer rate, not merely for opening/closing the door lock and so on, the application of such a wireless communication apparatus to the keyless system poses such problems as mentioned below.

The first problem is power consumption. The wireless communication apparatus built in the portable terminal is designed for high-speed data transfer as mentioned above, and consumes much more power than low-speed, low-frequency radio modules used in the keyless systems. Accordingly, from the viewpoints of the power consumption of the portable terminal and the battery life, it is difficult to implement a system that automatically opens the door lock when the user approaches the car.

Another problem is the coverage area. Ordinary keyless systems are intended only to open/close the door lock and have an optimum coverage area of about 10 m, for instance, and hence such systems can be designed and mounted in the portable terminal. However, the wireless communication apparatus of the portable terminal is designed for data transfer. Further, since the coverage area is determined by the wireless communication specifications, it is difficult to set the coverage area optimum for the keyless system. In the case of the Bluetooth system, a Class 3 module is usually mounted in the portable terminal, but its effective coverage area is as large as approximately 20 m. Accordingly, even when the user passes by the car at some distance with no intension of approaching the car, authentication is likely to be performed, resulting the door lock being opened.

BRIEF SUMMARY OF THE INVENTION

It is therefore an object of the present invention to provide a communication apparatus; a portable terminal and a communication program that quickly establish connection between the portable terminal and a terminal authenticator and reduce overall power consumption.

A communication apparatus according to one embodiment of the present invention, comprising:

an identification information request receiver which upon conducting wireless communication a plurality of times without interruption, if it is assumed that a wireless signal sent by either one of said portable terminal being a communication destination or a communication source reaches the other without fail, a minimum duration of identification information request receiving state is set as a first period during which operation that the one sends identification information request and the other receives it and responds to it is feasible without fail, a minimum duration of connection request receiving state is set as a second period during which operation that the one sends connection request and the other receives it and responds to it is feasible without fail, and a sum of the first and second periods is set as a third period, receives periodically the identification information request from said portable terminal during a period not shorter than the first period and not longer than three-fold period of the first period, for each period not shorter than the third period and not longer than three-fold period of the third period;

a response transmitter which sends a response signal including terminal information to said portable terminal when said identification information request receiver has received the identification information request;

a connection request receiver which periodically accepts the connection request from said portable terminal during a period not shorter than the second period and three-fold period not longer than the second period, for each period not shorter than the third period and not longer than three-fold period of the third period;

a link connection establishment unit configured to establish a wireless link with said portable terminal when said connection request receiver has received the connection request; and an execution controller which controls an execution apparatus for executing a prescribed operation after said link connection establishment unit has established the wireless link.

Furthermore, a portable terminal according one embodiment of the present invention, comprising:

an identification information request unit which upon conducting wireless communication a plurality of times without interruption, if it is assumed that a wireless signal sent by either one of said communication apparatus being a communication destination or a communication source reaches the other without fail, a minimum duration of identification information request receiving state is set as a first period during which operation that the one sends identification information request and the other receives it and responds to it is feasible without fail, a minimum duration of connection request receiving state is set as a second period during which operation that the one sends connection request and the other receives it and responds to it is feasible without fail, and a sum of the first and second periods is set as a third period, sends the identification information request at least once during a period not shorter than the third period and not longer than three-fold period of the third period, for each period not shorter than the third period and not longer than three-fold period of the third period;

an identification information response receiver which receives the identification information response sent from said communication apparatus which has received the identification information request;

a connection request unit configured to send a link connection request to said communication apparatus which has sent the identification information response;

a connection request response receiver which receives a connection request response sent by said communication apparatus which has received the link connection request; and a link connection establishment unit configured to establish the wireless link with said communication apparatus which has sent the connection request response.

Furthermore, a communication control program according to one embodiment of the present invention, comprising:

upon conducting wireless communication a plurality of times without interruption, if it is assumed that a wireless signal sent by either one of said portable terminal being a communication destination or a communication source reaches the other without fail, a minimum duration of identification information request receiving state is set as a first period during which operation that the one sends identification information request and the other receives it and responds to it is feasible without fail, a minimum duration of connection request receiving state is set as a second period during which operation that the one sends connection request and the other receives it and responds to it is feasible without fail, and a sum of the first and second periods is set as a third period, receiving periodically the identification information request from said portable terminal during a period not shorter than the first period and not longer than three-fold period of the first period, for each period not shorter than the third period and not longer than three-fold period of the third period;

sending a response signal including terminal information to said portable terminal upon receiving the identification information request;

accepting periodically the connection request from said portable terminal during a period not shorter than the second period and three-fold period not longer than the second period, for each period not shorter than the third period and not longer than three-fold period of the third period;

establishing a wireless link with said portable terminal upon receiving the connection request; and controlling an execution apparatus for executing a predetermined operation after said link connection establishment unit has established the wireless link.

Furthermore, a communication control program according to one embodiment of the present invention, comprising:

upon conducting wireless communication a plurality of times without interruption, if it is assumed that a wireless signal sent by either one of said communication apparatus being a communication destination or a communication source reaches the other without fail, a minimum duration of identification information request receiving state is set as a first period during which operation that the one sends identification information request and the other receives it and responds to it is feasible without fail, a minimum duration of connection request receiving state is set as a second period during which operation that the one sends connection request and the other receives it and responds to it is feasible without fail, and a sum of the first and second periods is set as a third period, sending the identification information request from said portable terminal at least once during a period not shorter than the third period and not longer than three-fold period of the third period, for each period not shorter than the third period and not longer than three-fold period of the third period;

receiving the identification information response sent from said communication apparatus which has received the identification information request;

sending a link connection request to said communication apparatus which has sent the identification information response;

receiving a connection request response sent by said communication apparatus which has received the link connection request; and establishing the wireless link with said communication apparatus which has sent the connection request response.

DRAWINGS

FIG. 2 is a flowchart showing one example of processing procedure in the terminal authenticator 3 of FIG. 1.

FIG. 3 is a flowchart showing an example of processing procedure of the portable terminal 2 of FIG. 1.

FIG. 7 is a flowchart showing processing procedures of portable terminal 2 in communication system according to third embodiment of the present invention.

FIG. 8 is a block diagram showing internal configuration of portable terminal 2 in communication system according to third embodiment of the present invention.

FIG. 9 is a block diagram showing internal configuration of terminal authenticator 3 in communication system according to third embodiment of the present invention.

FIG. 11 is a block diagram showing internal configuration of terminal authenticator 3 in communication system according to fifth embodiment of the present invention.

FIG. 13 is a block diagram showing internal configuration of terminal authenticator 3 in communication system according to sixth embodiment of the present invention.

FIG. 14 is a block diagram showing internal configuration of terminal authenticator 3 in communication system according to seventh embodiment of the present invention.

FIG. 15 is a block diagram showing internal configuration of portable terminal 2 in communication system according to eighth embodiment of the present invention.

FIG. 17 is a block diagram showing internal configuration of portable terminal 2 in communication system according to ninth embodiment of the present invention.

DETAILED DESCRIPTION OF THE INVENTION

Hereinbelow, a communication apparatus, a portable terminal, and a communication control program according to the present invention are described in detail with reference to the accompanying drawings.

First Embodiment

Figure 1:
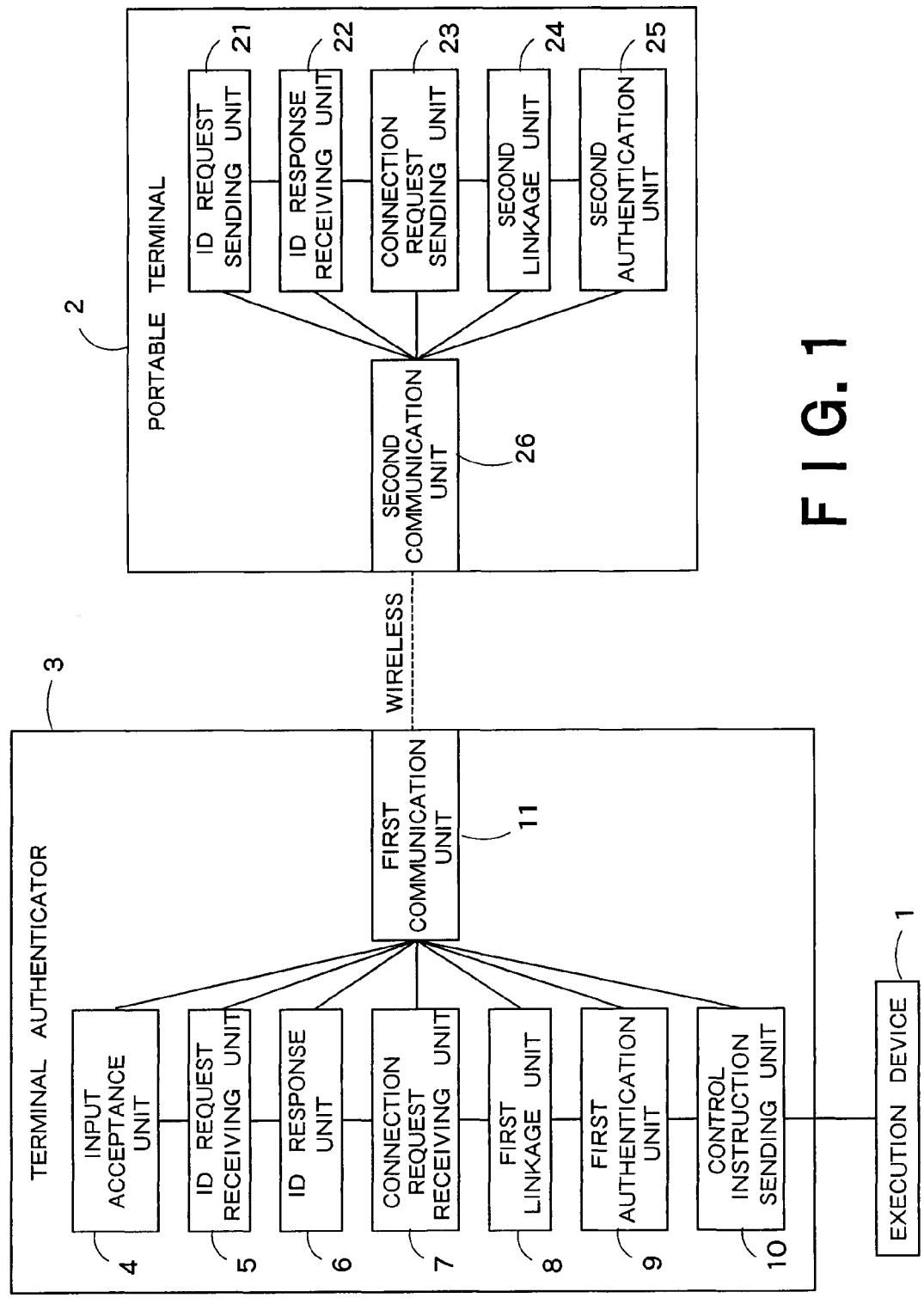
FIG. 1 is a block diagram showing a general configuration of the first embodiment of the communication system according to the present invention.

FIG. 1 is a block diagram showing a general configuration of the first embodiment of the communication system according to the present invention, which is used, for instance, as a car keyless entry system.

The communication system of FIG. 1 is provided with an execution apparatus 1 that calls for user authentication and locks/unlocks the car door only when the validity of the user is authenticated, a portable terminal 2 that is authenticated for operating the execution apparatus 1, and a terminal authenticator 3 that authenticates the portable terminal 2.

The illustrated communication system starts its operation upon pressing of a system startup instruction button (not shown) by the user. The system startup instruction button is mounted on the car door, for instance, to instruct unlocking the door. The portable terminal 2 is not responsive to such a startup instruction as is given to the terminal authenticator 3, but is always driven. The portable terminal 2 periodically sends a request for identification data (hereinafter, "ID request") as described in detail later on. When the user carrying the portable terminal 2 presses the system startup instruction button in the neighborhood of the car, the portable terminal 2 is automatically connected to the terminal authenticator 3, which authenticates the terminal 2. If the terminal 2 is authenticated as being valid, the terminal authenticator 3 instructs the execution apparatus 1 to open the door lock, for instance.

Such a startup instruction button may be omitted from the terminal authenticator 3, and the terminal authenticator 3 may be driven at all times. In such an instance, the terminal authenticator 3 begins to operate when the portable terminal 2 carried by the user is brought into the radio service area of the terminal authenticator 3. For example, if its radio service area is set at 1 m in every direction, the terminal authenticator 3 begins its operation when the user enters the 1-m range around the car. By providing a startup instruction button to drive the terminal authenticator 3 as required, it is possible to suppress its power consumption. From the viewpoint of security, it is rather preferable to start up the terminal authenticator 3 in response to a clear indication of user's intention to lock/unlock the car door. The following description will be given on the assumption that such a startup instruction button is provided.

The terminal authenticator 3 includes an input acceptance unit 4 which detects pressing of the startup instruction button; an ID request receiving unit 5 which receives a request for identification data from the portable terminal 2; an ID response unit 6 which sends a response to the request for identification data (hereinafter, "ID response") to the portable terminal 2; a request-to-connect (hereinafter, "connection request") receiving unit 7 which receives a connection request from the portable terminal 2; a first linkage unit 8 which establishes a link to the portable terminal 2; a first authentication unit 9 which performs authentication processing in cooperation with the portable terminal 2; a control instruction sending unit 10 which sends a control instruction for controlling the operation of the execution apparatus 1: and a first communication unit 11 which communicates with the portable terminal 2.

The portable terminal 2 includes: an ID request sending unit 21 which sends the ID request to the terminal authenticator 3; an ID response receiving unit 22 from the terminal authenticator 3; a connection request sending unit 23 which sends the connection request to the terminal authenticator 3; a second linkage unit 24 which establishes a link to the terminal authenticator 3; a second authentication unit 25 which performs authentication processing in cooperation with the terminal authenticator 3; and a second communication unit 26 which communicates with the first communication unit 11 of the terminal authenticator 3.

FIG. 2 is a flowchart showing one example of processing procedure in the terminal authenticator 3 of FIG. 1. The procedure begins with determining whether the user has pressed or not the startup instruction button (not shown) mounted on the car door (step S1). The startup instruction button is one that is used by the user to instruct opening/closing the door lock.

When it is determined that the user has pressed the instruction button, the terminal authenticator 3 makes a check to see if it has received an ID request sent from the portable terminal 2 (step S2). When having received the request, the terminal authenticator 3 sends an ID response to the portable terminal 2 having sent the request (step S3), and goes back to step S1.

When it is determined in step S2 that no ID request has been received, the terminal authenticator 3 makes a check to determine whether it has received a connection request (step S4). When having received no such request, the terminal authenticator 3 returns to step S1; when having received the request, the terminal authenticator 3 establishes a link to the portable terminal 2 having sent the request (step S5). In the latter case, the terminal authenticator 3 performs authentication processing between it and the portable terminal 2 (step S6), and determines whether the portable terminal 2 is authenticated as being valid (step S7).

When the portable terminal 2 is found valid, the terminal authenticator 3 sends an execution instruction to the execution apparatus 1 (step S8), and cuts the link with the portable terminal 2 (step S9). When the portable terminal 2 is found invalid in step S7, too, the terminal authenticator 3 goes to step S9, breaking the link with the portable terminal 2, followed by the return to step S1.

FIG. 3 is a flowchart showing an example of processing procedure of the portable terminal 2 of FIG. 1. In the first place, the portable terminal 2 sends an ID request to the terminal authenticator 3 (step S11), then determines if it has received an ID response from the terminal authenticator 3 (step S12). If it has not received the response, the portable terminal 2 returns to step S11, whereas when it has received the response, the portable terminal 2 sends a connection request to the terminal authenticator 3 (step S13).

Next, the portable terminal 2 determines whether it has received a response to the connection request (hereinafter, "connect response") from the terminal authenticator 3 (step S14), and if so, the portable terminal 2 performs connection processing (step S15), followed by authentication processing (step S16). Upon completion of communications with the terminal authenticator 3 after establishing a link therewith, the portable terminal 2 cuts the link (step S17).

Figure 4A:
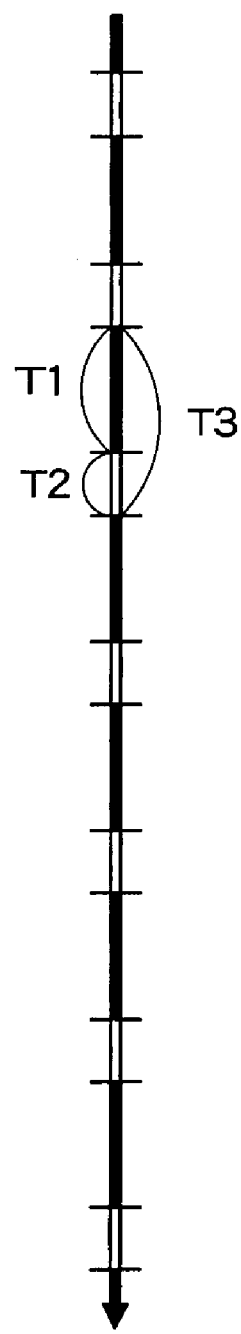
FIGS. 4A and 4B are diagrams showing sending/receiving timings of ID request and connection request sent and received between portable terminal 2 and terminal authenticator 3.
Figure 4B:
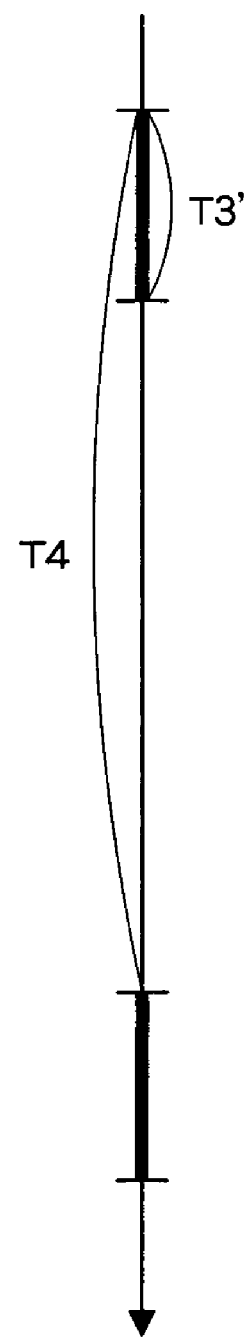

FIGS. 4A and 4B show the timing for sending and receiving the ID request and the connection request between the portable terminal 2 and the terminal authenticator 3. The following description will be given on the assumption that when the portable terminal 2 and the terminal authenticator 3 conduct wireless communications with each other a plurality of times without interruption, a wireless signal sent from either one of them reaches the other without fail. Based on above assumption, according to the present embodiment, the minimum duration of the ID request receiving state is set as a first period during which operation that the one sends the ID request and the other receives it and responds to it is feasible without fail, the minimum duration of the connection request receiving state is set as a second period during which operation that the one sends the connection request and the other receives it and responds to it is feasible without fail, and a sum of the first and second periods is set as a third period. The lengths of the first, the second, and the third periods are determined by the communication system or scheme actually used and its usage conditions.

As shown in FIG. 4A, on the instruction button being pressed, the terminal authenticator 3 sets a period T1 equal to the above-mentioned first period as the period during which it receives the ID request from the portable terminal 2 (which period T1 will hereinafter be referred to as "ID request receiving period"), and a period T2 equal to the above-mentioned second period as the period during which the terminal authenticator 3 receives the connection request from the portable terminal 2 (which period T2 will hereinafter be referred to as "connection request receiving period"). The terminal authenticator 3 sets the ID request receiving period T1 and the connection request receiving period T2 with a period T3. The period T3 is set equal to the above-mentioned third period.

As shown in FIG. 4B, the portable terminal 2 sets a period T3' equal to the above-mentioned third period T3 as a period during which it continuously sends the ID request to the terminal authenticator 3 (which period will hereinafter referred to as "ID request sending period"). The portable terminal 2 periodically sets the ID request sending period T3' every fourth period T4 (where T4>T3').

The reason for adopting the above scheduling will be described in detail below. Let it be assumed that the periods T1, T2, T3, and T3' are not always equal to the first period, the second period, the third period, and the third period, respectively.

The portable terminal 2 periodically sends the ID request at all times. The power consumption is in proportion to T3'/T4, and hence it decreases with an increase of T4 with respect to T3'. However, an increase of T4 also increases the amount of time until the terminal authenticator 3 receives the request, causing an increase in the response time of the terminal authenticator 3 and hence degrading its response accordingly. To reduce power consumption without increasing the response time, T3' needs to be shortened. Since too much reduction of T3' makes it impossible for the portable authenticator 3 to receive the request, however, there is usually a limit value. Conversely, setting T3' at the limit value permits minimization of the power consumption of the portable terminal 2.

Figures 5A, 5B:
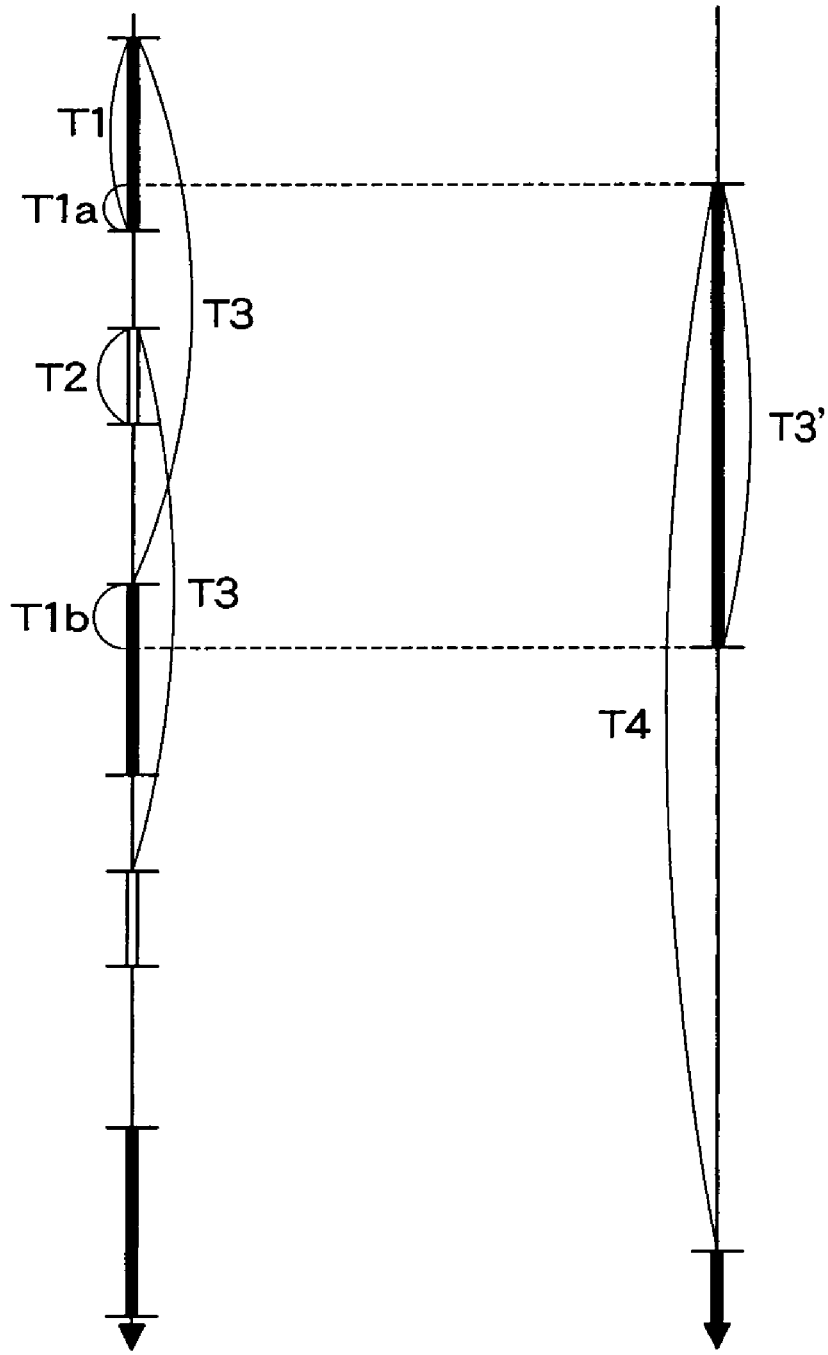
FIGS. 5A and 5B are sequence diagrams showing sending/receiving timings of ID request and connection request sent and received between portable terminal 2 and terminal authenticator 3.

The limit value of T3' is the shortest duration that ensures the reception of the ID request by the terminal authenticator 3. To meet this requirement, it is necessary that T3'≧[first period]. Usually, however, as shown in FIGS. 5A and 5B, while the portable terminal 2 is sending the ID request over the period T3', the terminal authenticator 3 may sometimes be in the connection request receiving state (the period T2) or in the non-receiving state (the period T3−T2−T1) in which it does not receive either of the ID request and the connection request. In order for the request to be received by the terminal authenticator 3 without fail, it is necessary that T3'≧[first period]+T2+[non-receiving period]. The first period corresponds to T1$a$+T1$b$ in FIG. 5A.

To minimize T3', the non-receiving period can be reduced to zero; that is, T3=T1+T2. In this instance, the terminal authenticator 3 is in its receiving state at all times, and hence its power consumption increases, but it is ignored in this case. Next, T2 can be reduced down to the second period, as described above.

As a result, T3'≧[first period]+[second period]=[third period], and the minimum duration of T3' becomes equal to the third period. In this instance, T2=[second period], and T3=T1+[second period].

With respect to the connection request that the portable terminal 2 sends after obtaining its requested ID, consider a period T5 (not shown) between the start of sending of the connection request and its reception by the terminal authenticator 3. Since the period T5 is also related to the response time, it may preferably be as short as possible, but it is required to be T5≧[second period] as is the case with the above; to ensure the reception of the request by the terminal authenticator 3, T5≧T1+[second period]+[non-receiving period]. Hence, to reduce T5, the non-receiving period is reduced to zero, that is, T3=T1+T2, and T1 is set equal to the first period. As a result, T3=[first period]+[second period]=[third period].

For the two reasons given above, by setting T1, T2, T3, and T3' to be equal to the first period, the second period, the third period, and the third period, respectively, it is possible to suppress the power consumption of the portable terminal 2 while at the same time minimizing the response time of the terminal authenticator 3. The above is the principles of the present invention.

Next, concrete examples of the first and the second periods will be described. Assume, for example, that the portable terminal 2 performs frequency hopping to send the ID request or connection request, whereas the terminal authenticator 3 waits for the request at an arbitrary single frequency. The Bluetooth communication system is a typical example.

In order that the ID request may be received by the terminal authenticator 3 at least once in T3', the portable terminal 2 is required to ensure sending the ID request at least once at the frequency where the terminal authenticator 3 awaits the arrival of the request. To meet this requirement, terminal authenticator 3 needs to stay receive-enabled during at least one round of frequency hopping or switching of the portable terminal 2. Occasionally there arises the situation where the terminal authenticator 3 cannot receive the request already sent when the terminal authenticator entered the receive-enabled state. To ensure the reception of the request that is sent next at the same frequency, the terminal authenticator 3 may sometimes need to remain in the receive-enabled state for a period a little longer than the one-round period on the part of the portable terminal 2. This period is the first period T1 for the ID request and the second period T2 for the connection request.

For example, in the case of the Bluetooth communication system, when the portable terminal 2 receives an ID response from the terminal authenticator 3, the portable terminal 2 obtains an operation clock of its own and that of the terminal authenticator 3 as well. Based on the information thus obtained, the portable terminal 2 is capable of estimating the frequency at which the terminal authenticator 3 is currently awaiting the connection request. In this instance, the frequency to be hopped can be set at a value close to the estimated frequency. The second period T2 in such a case is 11.25 msec.

Because of mounting constrains or the like, the terminal authenticator 3 requires a predetermined amount of time to switch between the ID request receiving state and the connection request receiving state in some instances. Furthermore, even while the terminal authenticator 3 remains in the same receiving state, it may sometimes be put and held in the non-receiving state for a predetermined time by some operation switching. In such a case, T3 is the sum of the third period and the predetermined non-receiving period, and the same time T3' also becomes the sum of the third period and the above-said predetermined period. The same is true of the connection request receiving state.

In view of mounting constraints or the influence of disturbing waves, it may also be preferable to set T1, T2, T3, and T3', for example, three times longer to provide increased chances (three times in this case) of communication during T4.

Based on the assumption that a three-fold increase in the time length of each of the above-mentioned period enables the terminal authenticator 3 to receive the request from the portable terminal 2, the ID request receive-enabled period T1 of the terminal authenticator 3 may preferably be set to a period not shorter than the first period and not longer than the three-fold length of the first period. For the same reasons, the connection request receive-enabled period T2 may also be set to a period not shorter than the second period and not longer than its three-fold length. In this instance, the repetitive cycle T3 with which the ID request receive-enabled period T1 and the connection request receive-enabled period T2 alternate with each other becomes not shorter than the third period and not longer than its three-hold length.

At the same time, the ID request sending period T3' of the portable terminal 2 may also be set to a period not shorter than the third period T3 and not longer than its three-fold length. In this case, the repetitive cycle of the ID request sending period T3' becomes not shorter than the third period and not longer than the three-fold length thereof.

Figure 6:
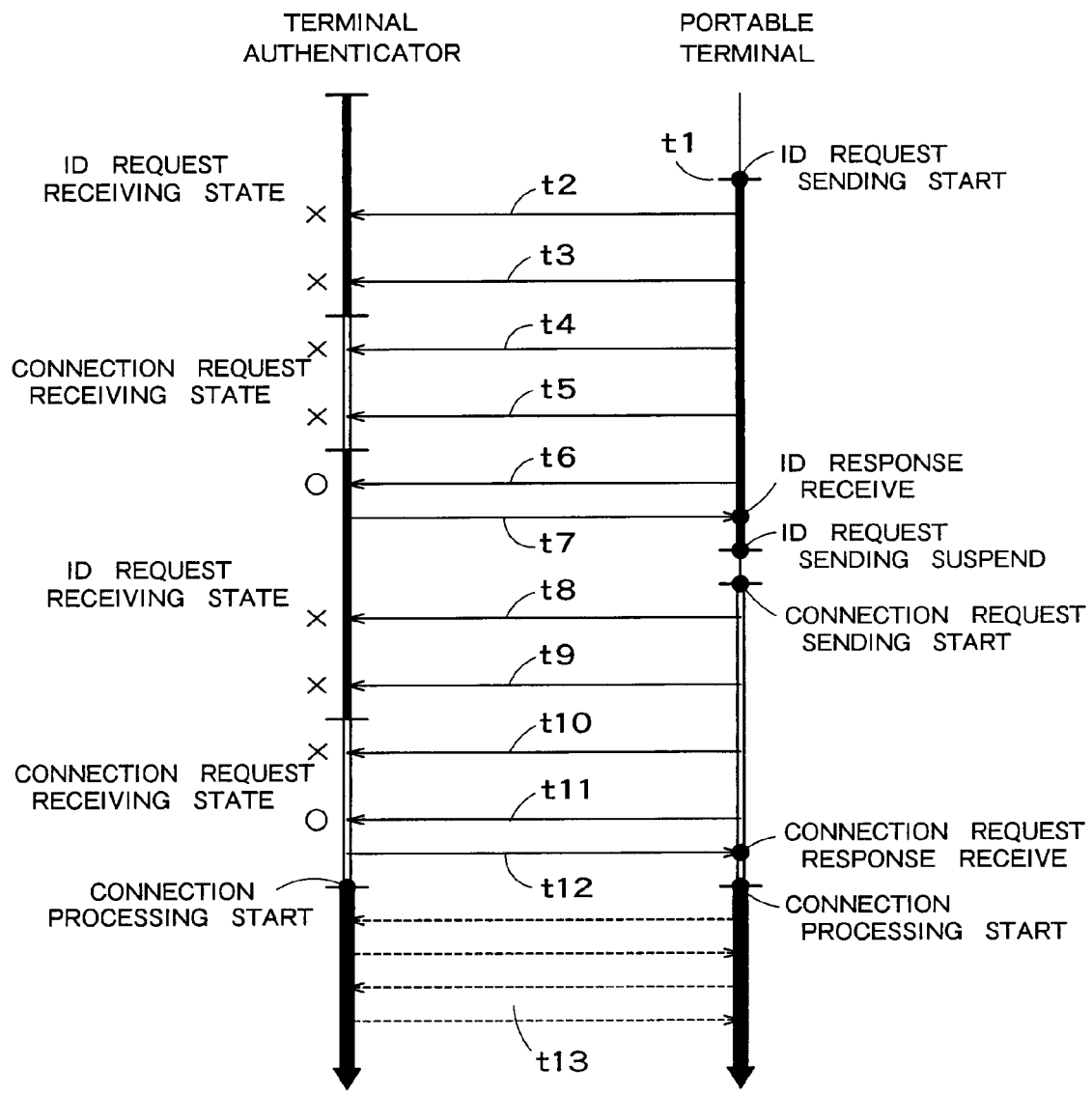
FIG. 6 is a sequence diagram showing sending/receiving timings between portable terminal 2 and terminal authenticator 3.

FIG. 6 is a sequence diagram showing the sending/receiving timing between the portable terminal 2 and the terminal authenticator 3. The portable terminal 2 begins to send the ID request at time t1. Since the portable terminal 2 sends the ID request at sequentially varying frequencies, the ID request of the first two rounds of sending is not accepted (time t2 to t3) because the sending frequencies do not match the receiving frequency of the terminal authenticator 3. The ID request of the next two rounds is not accepted, either, because the terminal authenticator 3 is not in the ID request receiving state but in the connection request receiving state (time t4 to t5). The sending frequency of the fifth round matches the receiving frequency of the terminal authenticator 3 for the first time, and hence the ID request is accepted (time t6).

On receiving the ID request, the terminal authenticator 3 sends a response signal to the portable terminal 2 (time t7), which, in turn, sends the connection request to the terminal authenticator 3 similarly at varying frequencies (time t8 to t11).

The connection request of the first two rounds of sending is not accepted because the terminal authenticator 3 is in the ID request receiving state (t8 to t9), and the request of the next round is not accepted because the receiving frequency of he terminal authenticator 3 does not match the sending frequency although the terminal authenticator 3 is in the connection request receiving state (time t10). The request of the fourth round is accepted by the terminal authenticator 3 for the first time (time t11), and the terminal authenticator 3 sends a response signal to the portable terminal 2 (time t12). Thereafter, the portable terminal 2 and the terminal authenticator 3 perform connection processing between them (time t13).

While FIG. 6 shows that the terminal authenticator 3 alternates the ID request receiving state and the connection request receiving state with each other, once a link to the portable terminal 2 is established, the ID request receiving period t2 and the connection request receiving period t3 need not be provided until the link is cut.

Similarly, the portable terminal 2 needs not to send the ID request until a link to the authenticator is cut once the link is established.

As described above, according to the first embodiment of the invention, since the periods during which the terminal authenticator 3 receives the ID request and the connection request from the portable terminal 2 are set as short as possible with the specifications of the wireless system used, and since the period for the portable terminal 2 to send the ID request is also set as short as possible with the specifications of the wireless system, the power consumption of the portable terminal 2 can be reduced without increasing the time for establishing the link with the terminal authenticator 3.

While the first embodiment has been described as being applied to the case where the execution apparatus 1 unlocks the car door, no particular limitations are imposed on concrete operations of the execution apparatus 1. The invention is also applicable to locking the car door, for instance.

The button for unlocking the car door is not limited specifically to a mechanical button; but, with a view to providing increased security, for example, a fingerprint communication system or PIN number system may be used. It is also possible to employ a non-contacting sensor system that automatically detects the presence of the user by use of an infrared sensor or the like. In short, any systems can be used as long as they serve to trigger the operation.

Second Embodiment

Upon pressing of the instruction button to start up the execution apparatus 1 (such as a car door unlocking unit), the terminal authenticator 3 immediately enters the receiving state, and hence consumes power accordingly. If the instruction button is left pressed for a long time, the battery power is severely consumed. If the button is accidentally or intentionally held pressed, the battery easily goes dead.

To avoid this, the portable terminal 2 and the terminal authenticator 3 may forcefully be disconnected in the event that the instruction button is kept pressed for longer than a predetermined time (for instance, 5 seconds).

FIG. 7 is a flowchart showing the procedure of the terminal authenticator 3 in the second embodiment of the communication system according to the present invention. The first step is to make a check to see if the instruction button is pressed or not (step S21), and if not, the procedure returns to step S21. If the instruction button is pressed, it is determined whether the elapsed time after the pressing of the button is within a predetermined time (for instance, 5 seconds). If so, the terminal authenticator 3 performs the processing as that of steps S2 to S9 in FIG. 2 (steps S23 to S30), whereas if not, the terminal authenticator 3 stops to receive the ID request and the connection request from the portable terminal 2, then goes back to step S21, and waits until the button is pressed again.

When the instruction button is pressed for longer than the predetermined time, it is advisable to sound a beep as a warning.

As described above, the second embodiment effects such control as not to leave the instruction button pressed for a long time, preventing unnecessary battery power consumption.

Third Embodiment

The third embodiment is to control the durations of the ID request sending period and the time intervals according to the amount of remaining amount of battery.

FIG. 8 is a block diagram showing internal configuration of the portable terminal 2 according to the third embodiment. In FIG. 8, the parts corresponding to those in FIG. 1 are identified by like reference numerals. The following description will focus mainly on differences between the FIG. 1 and FIG. 8.

The portable terminal 2 in FIG. 8 has, in addition to the components shown in FIG. 1, a remaining amount battery information input unit 27 for obtaining remaining amount of battery, and a transmission control unit 28 for controlling the transmission of the ID request to the terminal authenticator 3.

The remaining amount battery information input unit 27 inputs thereto the remaining amount of battery information from a remaining amount battery sensor (not shown) that senses how much the remaining amount is. The transmission control unit 28 increases the time length of the fourth period T4 as the remaining amount of battery decreases, for instance. Alternatively, the third period T3' is reduced with a decrease in the remaining amount; but the period T3' does not become shorter than the third period.

As described above, according to the third embodiment, since the time for sending the ID request is controlled according to how much the remaining amount of battery is, it is possible to achieve optimum driving of the portable terminal 2 taking into account the balance between remaining amount of battery and user convenience.

Fourth Embodiment

The fourth embodiment is intended to perform terminal authentication in the terminal authenticator 3 by reference to the result of authentication processing in an external authenticator.

FIG. 9 is a block diagram showing internal configuration of the terminal authenticator 3 according to the fourth embodiment of the communication system according to the present invention. In FIG. 9, the parts corresponding to those in FIG. 1 are identified by like reference numerals. The following description will mainly focus on differences between FIG. 1 and FIG. 9.

The communication system in FIG. 9 has an external authenticator 30 provided separate from the terminal authenticator 3. The external authenticator 30 performs authentication of the portable terminal 2. Any known authentication schemes will do. For example, in the Challenge Handshake Authentication scheme, the external authenticator 30 sends a challenge to the portable terminal 2, which in turn sends back a response to the external authenticator 30, which verifies the portable terminal 2 by authenticating the response.

The terminal authenticator 3 of FIG. 9 has, in addition to the components in FIG. 1, a third communication unit 14 for communicating with the external authenticator 30 and the first authentication unit 9, and an upper protocol linkage unit 15. The third communication unit 14 sends to and receives from the external authenticator 30 information about authentication of the portable terminal 2, and sends the result of authentication by the external authenticator 30 to the first authentication unit 9.

The first authentication unit 9 performs authentication with reference to the result of authentication by the external authenticator 30. More specifically, the first authentication unit 9 performs authentication only when authentication by the external authenticator 30 is successful.

Figure 10:
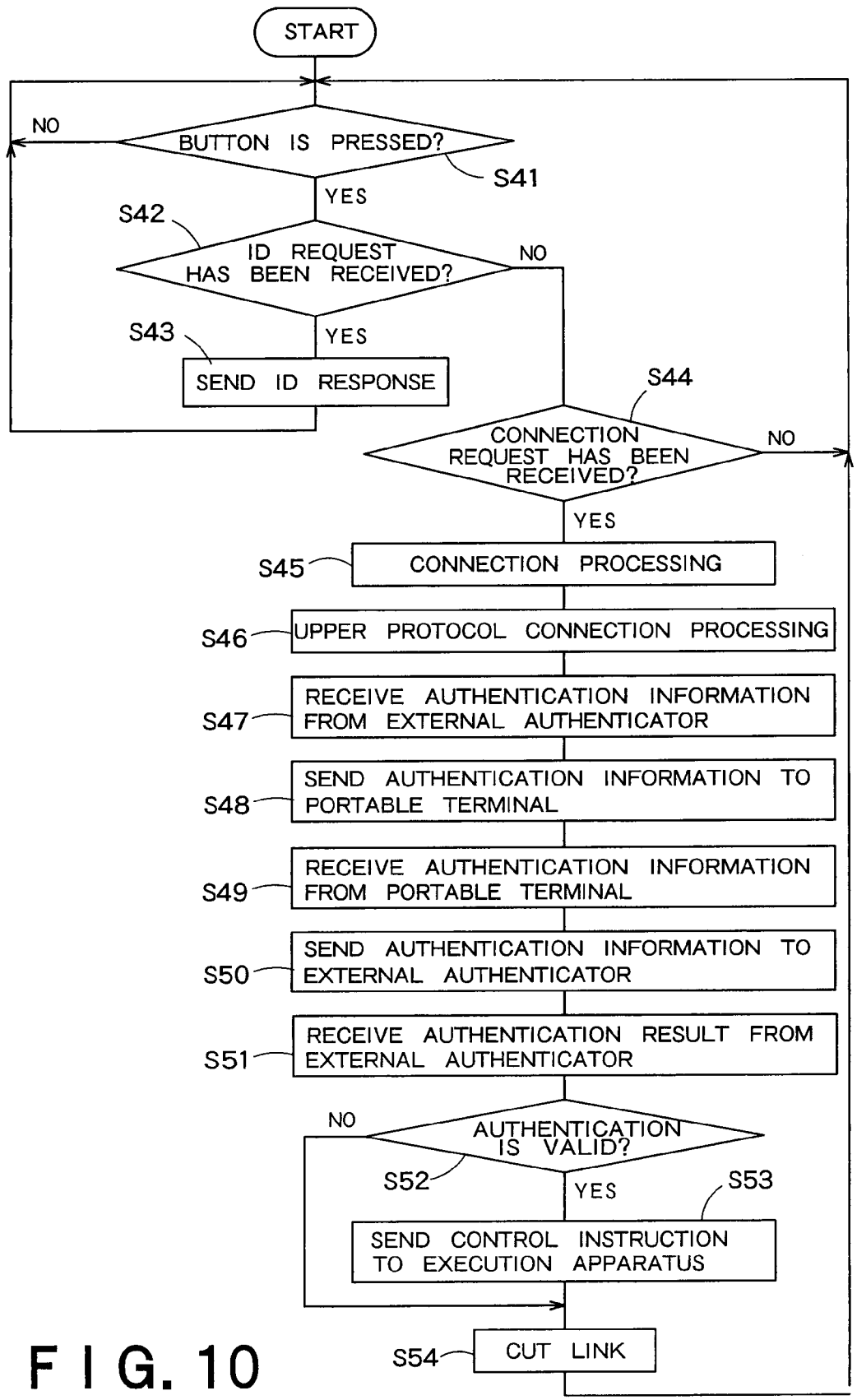
FIG. 10 is a flowchart showing processing procedure of terminal authenticator 3 of FIG. 9.

FIG. 10 is a flowchart showing an example of the procedure performed by the terminal authenticator 3 in FIG. 9. The procedure starts with checking whether the instruction button (not shown) is pressed or not (step S41), and if so, the terminal authenticator 3 determines whether it has received the ID request from the portable terminal 2 (step S42). When having received the ID request, the terminal authenticator 3 sends an ID response to the portable terminal 2 (step S43), thereafter returning to step S41.

When the ID request has not been received from the portable terminal 2, the terminal authenticator 3 determines whether it has received a connect response or not (step S41); if not received, the terminal authenticator 3 returns to step S41, and if received, the terminal authenticator 3 performs connection processing (step S45).

Next, the terminal authenticator 3: performs linkage processing (step S46); receives authentication information from the external authenticator 30 (step S47); sends the authentication information to the portable terminal 2 (step S48); receives authentication information from the portable terminal 2 (step S49); and sends the authentication information to the external authenticator 30 (step S50). Based on the authentication information sent thereto, the external authenticator 30 authenticates the portable terminal 2, after which the terminal authenticator 3 receives the result of authentication from the external authenticator 30 (step S51).

Following this, the terminal authenticator 3 determines if the portable terminal 2 is authenticated (step S52); if so, then the terminal authenticator 3 sends control instruction to the execution apparatus 1 to operate (step S53), cutting the link with the portable terminal 2 (step S54). If the portable terminal 2 is not authenticated, the terminal authenticator 3 performs step S54.

As described above, the fourth embodiment performs authentication processing in the terminal authenticator 3 based on the result of authentication by the external authenticator 30. Accordingly, the present invention is applicable as well to a system which performs authentication processing separate from the terminal authenticator 3.

If provision is made to perform authentication by the external authenticator 30, the first authentication unit 9 may be removed from the terminal authenticator 3. Also it is possible to connect the execution apparatus 1 to the external authenticator 30 so that the latter directly instructs the former.

In another possible system configuration, the terminal authenticator 3 performs authentication processing between it and the portable terminal 2, and only when the latter is authenticated, the former performs authentication processing between it and the external authenticator 30. In this instance, necessary authentication information needs to be prestored in the terminal authenticator 3 or the like.

Fifth Embodiment

From the viewpoint of security, it is not preferable that the user is allowed to unlock the car door by the portable terminal 2 at a place far away from the car. The service area capable of opening the door may be limited by controlling wireless output, but in a high-frequency wireless communication system, such as Bluetooth, it is difficult to properly limit the service area using a plurality of frequencies by performing frequency hopping, under a communication regulation. In view of this, the fifth embodiment described below is to judge whether to operate the execution apparatus according to the distance between the car and the portable terminal 2.

FIG. 11 is a block diagram showing internal configuration of the terminal authenticator according to the fifth embodiment of the communication system. The illustrated terminal authenticator 3 has, in addition to configuration of the FIG. 1, a distance detector 16 for detecting the distance between the terminal authenticator 3 and the portable terminal 2. The distance detector 16 detects the distance between the terminal authenticator 3 and the portable terminal 2 through utilization of, for example, the propagation times of wireless signals that are exchanged between them or position information on the portable terminal 2 that is detected by a base station (not shown) with which the portable terminal 2 communicates.

The terminal authenticator 3 of FIG. 11 performs authentication only when the distance detected by the distance detector 16 is within a predetermined value (for example, 1 m) and the portable terminal is authenticated by the first authentication unit 9.

Either of the distance detection or the authentication may be performed first. When it is judged that the portable terminal 2 is within the predetermined distance from the terminal authenticator 3, or when the portable terminal 2 is not authenticated, either one of the distance detection or the authentication may be omitted.

Figure 12:
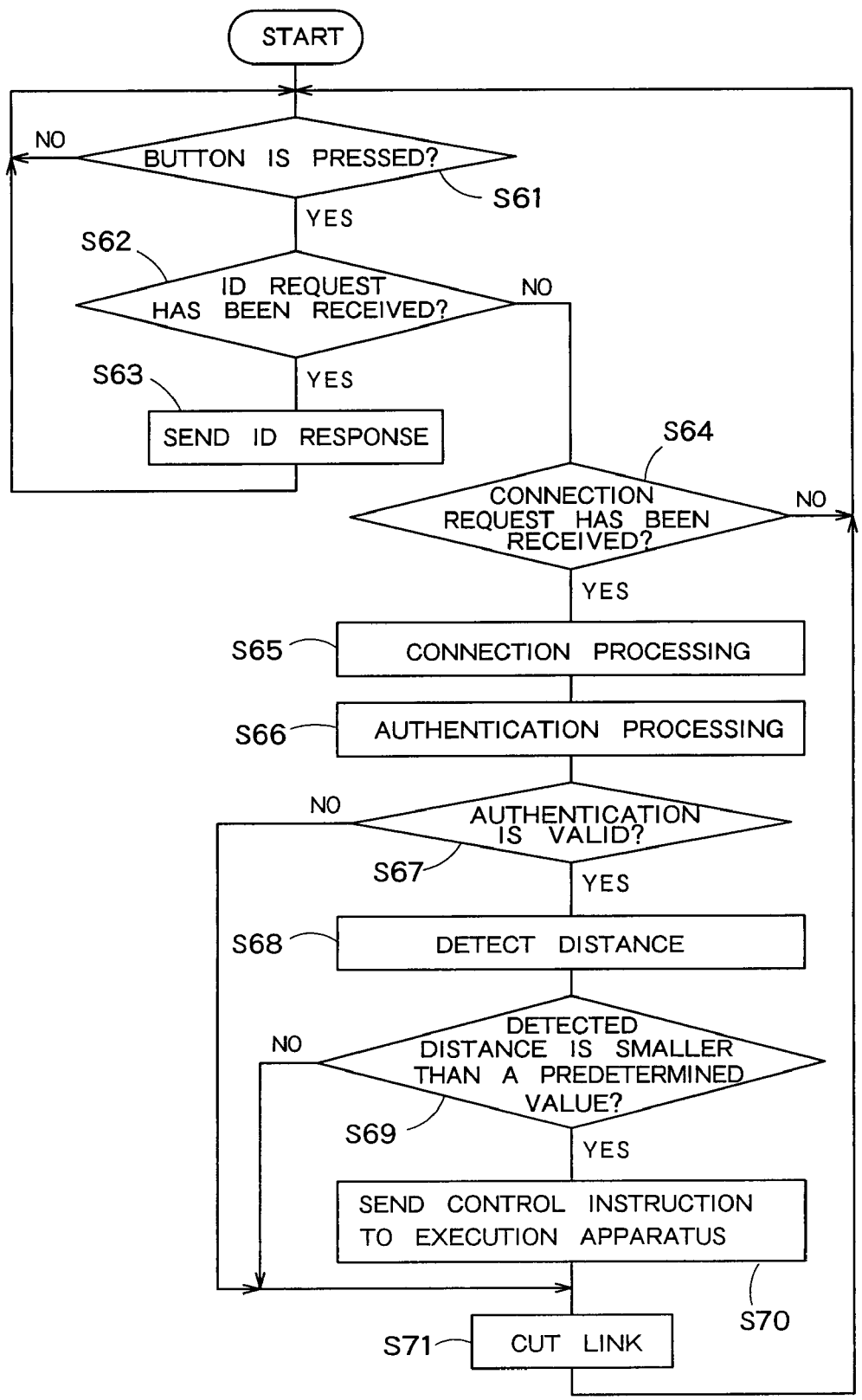
FIG. 12 is a flowchart showing processing procedure of terminal authenticator 3 of FIG. 11.

FIG. 12 is a flowchart showing an example of the procedure of the terminal authenticator 3. The flowchart of FIG. 12 has steps S68 and S69 in addition to the flowchart of FIG. 2. When the portable terminal 2 is authenticated, the portable authenticator 3 detects the distance to the portable terminal by the distance detector 16 (step S68), and determines if the detected distance is smaller than the predetermined value (step S69). If the distance is smaller than the predetermined value, then the terminal authenticator 3 determines that the user of the portable terminal 2 is close to the car, and controls the operation of the execution apparatus 1 (step S70). When the detected distance value is larger than the predetermined value, the terminal authenticator 3 cuts the link with the portable terminal 2 without putting the execution apparatus 1 into operation (step S71).

As described above, according to the fifth embodiment, when the distance between the terminal authenticator 3 and the portable terminal 2 is in excess of the predetermined value (1 m, for instance), the terminal authenticator 3 inhibits operation of the execution apparatus 1 irrespective of the result of authentication performed between the terminal authenticator 3 and the portable terminal 2, thereby improving security performance.

Sixth Embodiment

The sixth embodiment is a specific operative example of the fifth embodiment, which is adapted to detect the distance between the terminal authenticator 3 and the portable terminal 2 based on the measured value of radio-wave intensity.

FIG. 13 is a block diagram showing internal configuration of the terminal authenticator 3 of the communication system according to the sixth embodiment of the present invention. The terminal authenticator 3 has, in addition to configuration of the FIG. 11, a radio-wave intensity measurement unit 17 for measuring the received intensity of a wireless signal from the portable terminal 2.

When the received intensity measured by the radio-wave intensity measurement unit 17 exceeds a predetermined value, it is considered that the portable terminal 2 is in proximity thereto, the terminal authenticator 3 determines that the distance condition is satisfied. In this instance, when the portable terminal 2 is authenticated by the first authentication unit 9, the terminal authenticator 3 permits operation of the execution apparatus 1. When the received intensity measured by the radio-wave intensity measurement unit 17 is lower than the predetermined intensity, the terminal authenticator 3 stops the execution apparatus 1 from operation.

When the portable terminal 2 conducts frequency hopping, the antenna gain usually varies with frequency, making distance estimation more unstable. To avoid this, radio intensities of a plurality of frequencies (20 channels, for instance) are measured and their mean value can be used to judge the radio-wave intensity for each channel.

As described above, the sixth embodiment detects the distance between the terminal authenticator 3 and the portable terminal 2 based on the measured value of the radio-wave intensity, hence it permits accurate detection of distance by a simple procedure.

Seventh Embodiment

The seventh embodiment is a modified form of the sixth embodiment, which detects the distance between the terminal authenticator 3 and the portable terminal 2 after correcting the received intensity of the wireless signal from the portable terminal 2.

FIG. 14 is a block diagram showing internal configuration of the terminal authenticator 3 in the communication system according to the seventh embodiment of the present invention, The illustrated terminal authenticator 3 has, in addition to configuration of the FIG. 13, a radio-wave intensity correcting unit 18 for correcting the received intensity of the wireless signal from the portable terminal 2 and a wireless characteristic information storage 19 for storing corrected information by the radio-wave intensity correcting unit 18.

Since characteristics of an antenna and a wireless signal processing unit of the portable terminal 2 may sometimes change according to its kind, there are cases where the intensity measured in the terminal authenticator 3 differs even if the communication distance remains unchanged. In this instance, the received intensity is calibrated by the radio-wave intensity correcting unit 18 for each portable terminal 2, and the calibrated correction information is prestored in the wireless characteristic information storage 19.

When the received intensity of a wireless signal from a new portable terminal 2 is measured, the measured value is corrected based on the correction information prestored in the storage 19, and the corrected value of received intensity is used to detect the distance between the terminal authenticator 3 and the portable terminal 2.

As described above, according to the seventh embodiment, the terminal authenticator 3 detects the distance between it and the portable terminal 2 after correcting the received intensity for each portable terminal, ensuring accurate detection of the distance.

Eighth Embodiment

In the eighth embodiment, the portable terminal 2 is adapted only to communicated with a pre-registered terminal authenticator 3.

FIG. 15 is a block diagram showing internal configuration of the portable terminal 2 in the communication system according to the eighth embodiment of the present invention. The illustrated portable terminal 2 in FIG. 15 has, addition to the configuration of FIG. 1, a terminal authenticator register unit 31 for pre-registering each terminal authenticator 3 with which the portable terminal 2 is able to communicate, and a terminal authenticator checking unit 32 for checking whether the terminal authenticator 3 for the portable terminal 2 to communicate with is pre-registered in the terminal authenticator checking unit 31.

The terminal authenticator checking unit 31 has stored therein for example, device addresses of individual terminal authenticators. The device addresses are obtained from ID responses.

Figure 16:
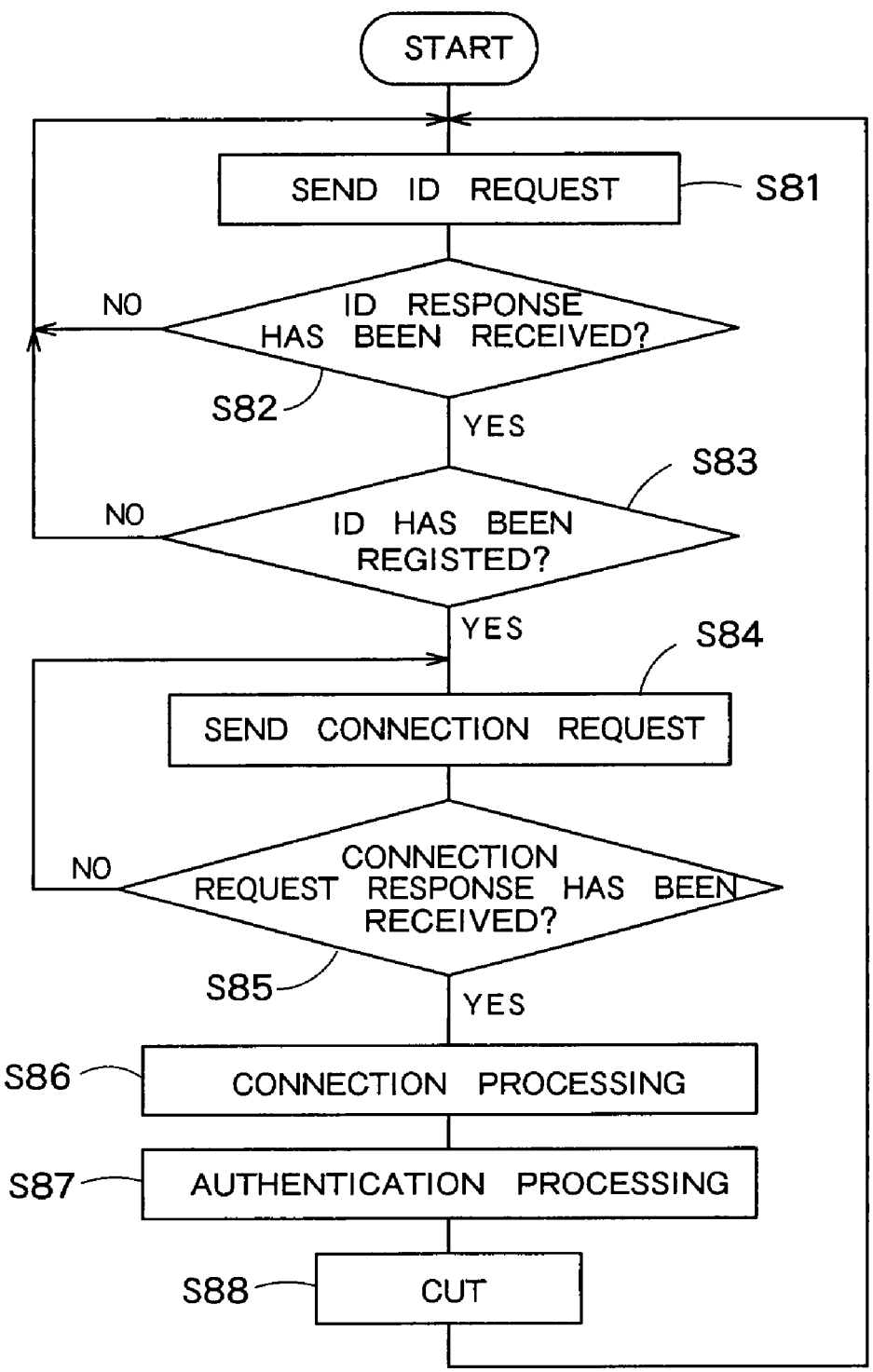
FIG. 16 is a flowchart showing processing procedure of portable terminal 2 of FIG. 15.

FIG. 16 is a flowchart showing the procedure of the portable terminal 2 of FIG. 15. The portable terminal 2 sends first an ID request to the terminal authenticator 3 (step S81), and determines if it has received an ID response from the terminal authenticator 3 (step S82). If not, the portable terminal 2 returns to step S81, and if the response is received, the portable terminal 2 determines whether the device address contained in the ID response is stored in the terminal authenticator register unit 31. If the device address is not found, then the portable terminal 2 goes back to step S81, whereas when the address is found, the portable terminal performs the same connection request sending and connection processing steps as those S13 to S16 in FIG. 3 (steps S84 to S87).

As described above, the portable terminal 2 of this embodiment communicates only with pre-registered terminal authenticators 3, providing increased security.

Ninth Embodiment

There is a case where although the portable terminal 2 has obtained Identification information from the terminal authenticator 3, the subsequent connection/authentication processing cannot be accomplished. This can occur when linkage process and the subsequent authentication process are more complex than the transmission and reception of connect information. The ninth embodiment is intended to offer a solution to the above-mentioned problem.

FIG. 17 shows in block form the internal configuration of the portable terminal 2 of the ninth embodiment of the communication system according to the present invention. The illustrated portable terminal 2 has a response time determination unit 33 and a notification unit 34 in the FIG. 1 configuration. The response time determination unit 33 determines whether the response time of a predetermined one of the processes from the sending of the connection request to the completion of authentication exceeds a predetermined value.

Such a determination is made, for example, when the response to the connection request is not received within a predetermined time (5 seconds, for instance), or when the response to a predetermined piece of data exchanged between the portable terminal 2 and the terminal authenticator 2 is not received after a certain elapsed time. When the response time is determined as exceeding the predetermined value, the notification unit 34 notifies the user of it by some means. When the response time determination unit 33 determines that the response time exceeds the predetermined value, the connection or authentication processing is immediately discontinued, and the notification unit 34 notifies the user of such a situation by means of sound, image or vibration. Thereafter, the portable terminal 2 resumes sending of the ID request.

As described above, according to this embodiment, when the response to a predetermined one of the processes from the start of sending the connection request to the completion of connection or authentication is not completed, the portable terminal 2 notifies the user of that effect, allowing him to know that the portable terminal 2 is not connected to the terminal authenticator 3, and its reason. This improves user convenience.

While in the above the present invention has been described as being applied to the car keyless system, the invention is applicable to various systems that operate the execution apparatus 1 trough use of the portable terminal.

Also, the present invention is applicable to systems that do not involve the authentication processing. In this kind of systems, the first authentication unit 9 and the second authentication unit 25 in FIG. 1 are unnecessary, permitting simplification of the overall system configuration.

At least a portion of functions that the communication apparatus and the portable terminal described in the above embodiment have may be constituted as software program. The program which realizes at least a portion of functions of the communication apparatus and the portable terminal may be stored in a recording medium such as a floppy disk or a CD-ROM or the like, loaded on a computer, and then executed by the computer. The recording medium is not limited to a portable recording medium such as a magnetic disk or an optical disk. A fixed recording medium such as a hard disk drive or a memory may be used.

The program may be distributed through a communication network (including wireless communication) such as the Internet or the like. In addition, the program may be coded, modulated, or compressed and then distributed through a cable network or a wireless network such as the Internet. Alternatively, the program may be distributed being stored in a recording medium.

What is claimed is:

1. A communication method, comprising:
upon conducting wireless communication a plurality of times without interruption, if it is assumed that a wireless signal sent by either one of a portable terminal being a communication destination or a communication source reaches the other, a minimum duration of identification information request receiving state is set as a first period during which operation that the one sends identification information request and the other receives it and responds to it is feasible, a minimum duration of connection request receiving state is set as a second period during which operation that the one sends connection request and the other receives it and responds to it is feasible, and a sum of the first and second periods is set as a third period, receiving periodically the identification information request from said portable terminal during a period not shorter than the first period and not longer than three-fold period of the first period, for each period not shorter than the third period and not longer than three-fold period of the third period;
sending a response signal including terminal information to said portable terminal upon receiving the identification information request;
accepting periodically the connection request from said portable terminal during a period not shorter than the second period and three-fold period not longer than the second period, for each period not shorter than the third period and not longer than three-fold period of the third period;
establishing a wireless link with said portable terminal upon receiving the connection request; and
controlling an execution apparatus for executing a predetermined operation after said link connection establishment unit has established the wireless link.

2. The communication method according to claim 1, further comprising acknowledging that there has been a startup instruction for the predetermined operation,
wherein the identification information request receiving state is started after being acknowledged that there has been a startup instruction continuously for a predetermined period; and
the connection request receiving state is started after being acquired that there has been a startup instruction of the predetermined operation.

3. The communication method according to claim 2, further comprising acknowledging whether or not said startup instruction has been acknowledged continuously for a predetermined period;
wherein if determined that the startup instruction has been acknowledged continuously for a predetermined period, the identification information request receiving state is suspended; and
if determined that the startup instruction has been acknowledged continuously for a predetermined period, the connection request receiving state is suspended.

4. The communication method according to claim 1, further comprising detecting a distance from said portable terminal,
wherein said execution apparatus is started up when authentication is authenticated as being valid and the detected distance is not more than a predetermined value.

5. A communication method, comprising:
upon conducting wireless communication a plurality of times without interruption, if it is assumed that a wireless signal sent by either one of a communication apparatus being a communication destination or a communication source reaches the other, a minimum duration of identification information request receiving state is set as a first period during which operation that the one sends identification information request and the other receives it and responds to it is feasible, a minimum duration of connection request receiving state is set as a second period during which operation that the one sends connection request and the other receives it and responds to it is feasible, and a sum of the first and second periods is set as a third period, sending the identification information request from said communication apparatus at least once during a period not shorter than the third period and not longer than three-fold period of the third period, for each period not shorter than the third period and not longer than three-fold period of the third period;

receiving the identification information response sent from said communication apparatus which has received the identification information request;

sending a link connection request to said communication apparatus which has sent the identification information response;

receiving a connection request response sent by said communication apparatus which has received the link connection request; and establishing the wireless link with said communication apparatus which has sent the connection request response.

6. The communication method according to claim 5, further comprising registering the identification information to identify the respective communication apparatuses; and determining whether or not the identification information to identify said communication apparatus obtained by the identification information response is registered, wherein the link connection request is sent to only said communication apparatus determined that the identification information is registered.

7. The communication method according to claim 5, further comprising:

determining whether or not a predetermined response has been obtained within a predetermined time during a period after transmitting the link connection request until the connection is finished or authentication is completed; and notifying that the connection request response has not been received within the predetermined time.

8. The communication method according to claim 5, further comprising:

acquiring remaining information of a battery for power supply; and controlling at least one of a duration to send the identification information request and a time interval after sending the identification information request until the next sending is started, based on the acquired remaining information.

* * * * *